(12) United States Patent
Ichiki et al.

(10) Patent No.: US 11,642,636 B2
(45) Date of Patent: May 9, 2023

(54) SOLUTION MIXER, FLUIDIC DEVICE, AND SOLUTION MIXING METHOD

(71) Applicants: The University of Tokyo, Tokyo (JP); Nikon Corporation, Tokyo (JP)

(72) Inventors: Takanori Ichiki, Tokyo (JP); Taro Ueno, Tokyo (JP); Shoichi Tsuchiya, Chigasaki (JP); Masashi Kobayashi, Tokyo (JP); Kenji Miyamoto, Yokohama (JP)

(73) Assignees: THE UNIVERSITY OF TOKYO, Tokyo (JP); NIKON CORPORATION, Tokyo (JP)

( * ) Notice: Subject to any disclaimer, the term of this patent is extended or adjusted under 35 U.S.C. 154(b) by 1031 days.

(21) Appl. No.: 16/216,299

(22) Filed: Dec. 11, 2018

(65) Prior Publication Data
US 2019/0126215 A1    May 2, 2019

Related U.S. Application Data

(60) Division of application No. 15/078,840, filed on Mar. 23, 2016, now abandoned, which is a continuation of
(Continued)

(30) Foreign Application Priority Data

Sep. 25, 2013  (JP) .............................. JP2013-199071

(51) Int. Cl.
*B01F 25/54* (2022.01)
*B01F 23/451* (2022.01)
(Continued)

(52) U.S. Cl.
CPC ............ *B01F 25/54* (2022.01); *B01F 23/451* (2022.01); *B01F 25/51* (2022.01); *B01F 33/30* (2022.01);
(Continued)

(58) Field of Classification Search
CPC ...... B01F 5/108; B01F 5/102; B01F 13/0059; B01F 25/54; B01F 25/51; B01F 33/30; B01L 3/5027; G01N 2035/00158
(Continued)

(56) References Cited

U.S. PATENT DOCUMENTS

| 6,960,437 B2 | 11/2005 | Enzelberger et al. |
| 2003/0008308 A1 | 1/2003 | Enzelberger et al. |

(Continued)

FOREIGN PATENT DOCUMENTS

| EP | 2409765 A1 * | 1/2012 | .......... B01F 13/0059 |
| JP | 2004-533605 A | 11/2004 | |

(Continued)

OTHER PUBLICATIONS

EPO Communication under Rule 62 EPC extended European search report dated Oct. 19, 2017 for European Application No. 14847140.2, 17 pages.

(Continued)

*Primary Examiner* — Marc C Howell
(74) *Attorney, Agent, or Firm* — Squire Patton Boggs (US) LLP

(57) ABSTRACT

A solution mixer comprising: a main flow path in which a solution circulates; at least one solution introduction flow path connected to the main flow path; and at least one solution discharge flow path connected to the main flow path, wherein the solution discharge flow path has at least one solution discharge flow path valve, and wherein the main flow path has at least one main flow path valve.

11 Claims, 19 Drawing Sheets

Specification includes a Sequence Listing.

Related U.S. Application Data application No. PCT/JP2014/075312, filed on Sep. 24, 2014.

(51) Int. Cl.

| | | |
|---|---|---|
| *B01F 25/51* | (2022.01) | |
| *B01F 33/30* | (2022.01) | |
| *B01F 35/75* | (2022.01) | |
| *G01N 1/38* | (2006.01) | |
| *G01N 35/00* | (2006.01) | |
| *B01L 3/00* | (2006.01) | |

(52) U.S. Cl.
CPC ......... *B01F 35/7547* (2022.01); *B01L 3/5027* (2013.01); *B01L 2300/0867* (2013.01); *G01N 2001/386* (2013.01); *G01N 2035/00158* (2013.01)

(58) Field of Classification Search
USPC .......................................................... 366/192
See application file for complete search history.

(56) References Cited

U.S. PATENT DOCUMENTS

| | | |
|---|---|---|
| 2004/0037739 A1 | 2/2004 | McNeely et al. |
| 2006/0160243 A1* | 7/2006 | Tang ........................ G01N 1/34 436/177 |
| 2009/0136982 A1 | 5/2009 | Tang et al. |
| 2009/0280475 A1 | 11/2009 | Pollack et al. |
| 2010/0184046 A1 | 7/2010 | Klass et al. |
| 2011/0136252 A1 | 6/2011 | Tseng et al. |
| 2011/0233446 A1* | 9/2011 | Chuang ............... F16K 99/0001 251/359 |
| 2012/0009663 A1 | 1/2012 | Enzelberger et al. |
| 2012/0136492 A1 | 5/2012 | Amin et al. |

FOREIGN PATENT DOCUMENTS

| | | |
|---|---|---|
| JP | 2009-528163 A | 8/2009 |
| JP | 2012-508577 A | 4/2012 |
| WO | WO 2002-072264 A1 | 9/2002 |
| WO | WO 2002/081729 A2 | 10/2002 |
| WO | WO 2007-103100 A2 | 9/2007 |
| WO | WO 2010-056337 A2 | 5/2010 |
| WO | WO 2010/115123 A2 | 10/2010 |
| WO | WO 2011/063324 A2 | 5/2011 |

OTHER PUBLICATIONS

EPO Communication under Rule 164(1) EPC supplementary European search report dated Jun. 19, 2017 for European Application No. 14847140.2, 16 pages.

Chen, Chihchen, et al. "Microfluidic isolation and transcriptome analysis of serum microvesicles," The Royal Society of Chemistry 2010, Lab Chip, vol. 10, pp. 505-511, www.rsc.org.loc.

Chung, Jaehoon, et al. "Microfluidic device for isolation and genetic analysis of microvesicles," Abstracts from the Second International Meeting of ISEV 2013 Boston, USA, Apr. 17-20, 2013, p. 100.

Hong, Jong Wook, et al. "A nanoliter-scale nucleic acid processor with parallel architecture," Nature Biotechnology, vol. 22, No. 4, Apr. 2004, pp. 435-439.

International Search Report for PCT/JP2014/075312, dated Dec. 16, 2014, 2 pp.

Translation of the International Search Report for PCT/JP2014/075312, dated Dec. 16, 2014, 2 pp.

Translation of Written Opinion for PCT/JP2014/075312, dated Dec. 16, 2014, 8 pp.

Written Opinion for PCT/JP2014/075312, dated Dec. 16, 2014, 6 pp.

Notice of Reasons For Rejection dated Jul. 31, 2018 for Japanese Application No. 2015-539273, with English translation, 11 pages.

Notice of Reasons for Rejection dated Mar. 27, 2020 for Japanese Patent Application No. 2019-089357, with English translation; 9 pages.

\* cited by examiner

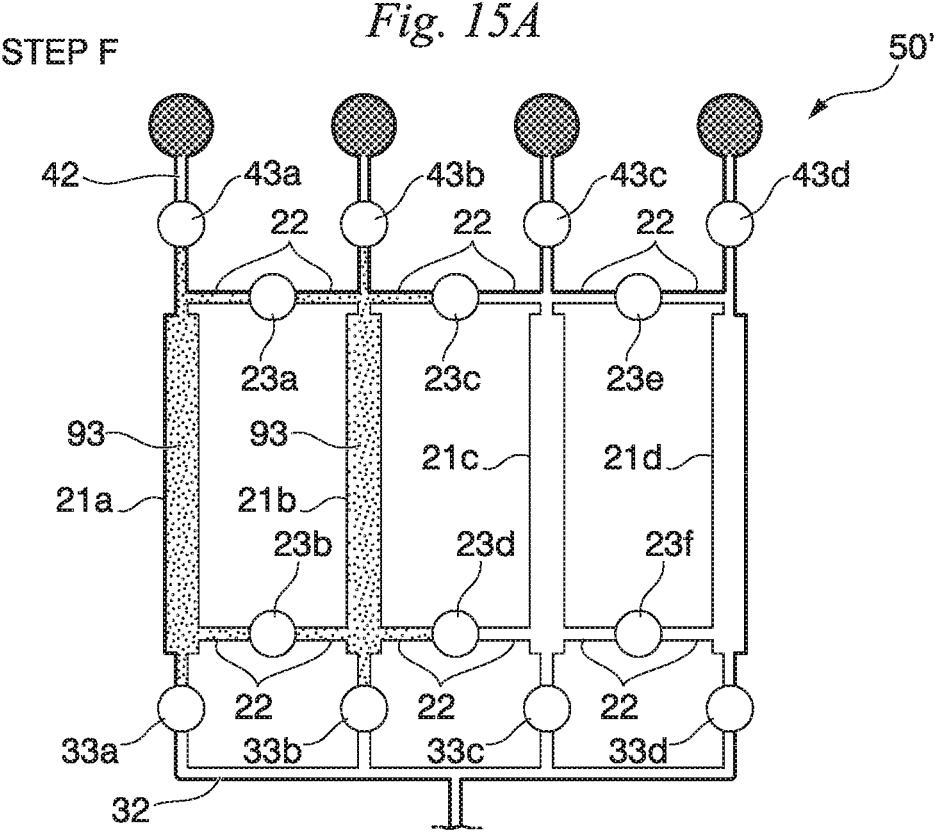
Fig. 15A STEP F
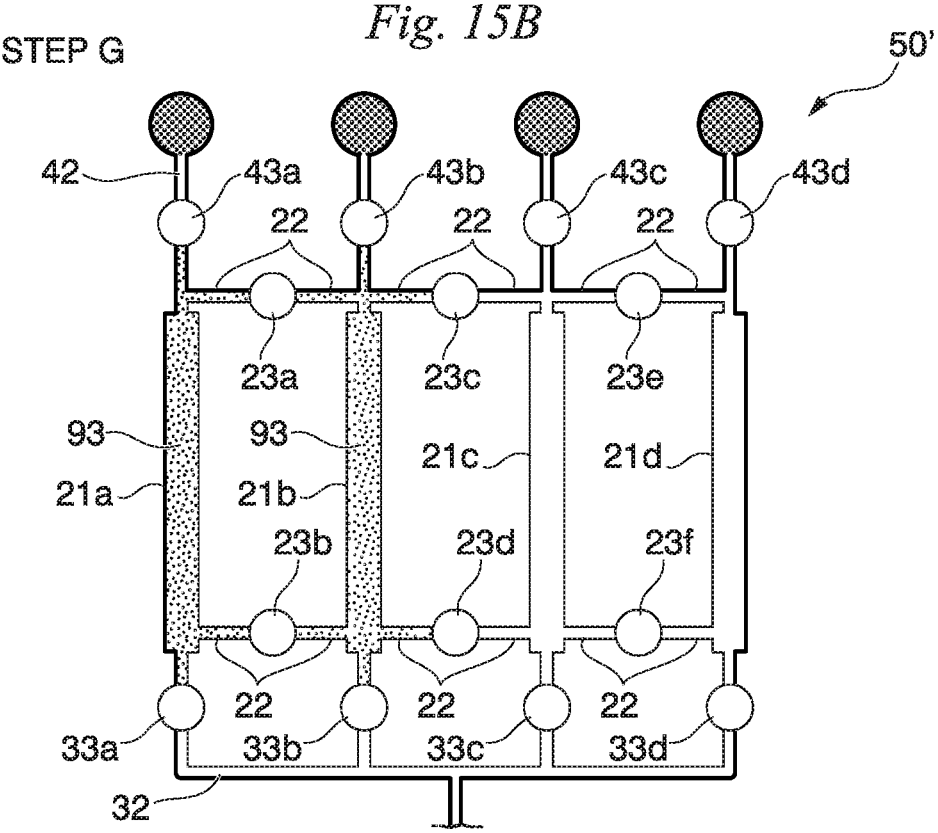
Fig. 15B STEP G

OPENING AND CLOSING STATUS OF PDMS VALVE   Open   Close

|  | Valve No | | | | | | | |
|---|---|---|---|---|---|---|---|---|
|  | 0 | 1 | 2 | 3 | 4 | 5 | 6 | 7 |
| 1. TUBE INTRODUCTION | Close | Close | Close | Open | Open | Open | Open | Open |
| 2. INLET 1 SOLUTION INTRODUCTION | Open | Close | Close | Close | Open | Open | Close | Open |
| 3. INLET 2 SOLUTION INTRODUCTION | Close | Open | Close | Close | Open | Open | Close | Close |
| 4. MIXING AND CIRCULATING TWO SOLUTIONS | Close | Close | Close | PERISTALIC OPERATION(100msec) Open-Close | | | Open | Close |
| 5. BYPASS WASHING | Close | Close | Open | Open | Open | Open | Close | Open |
| 6. CHAMBER WASHING | Close | Close | Open | Close | Close | Close | Open | Open |

*Fig. 21B*

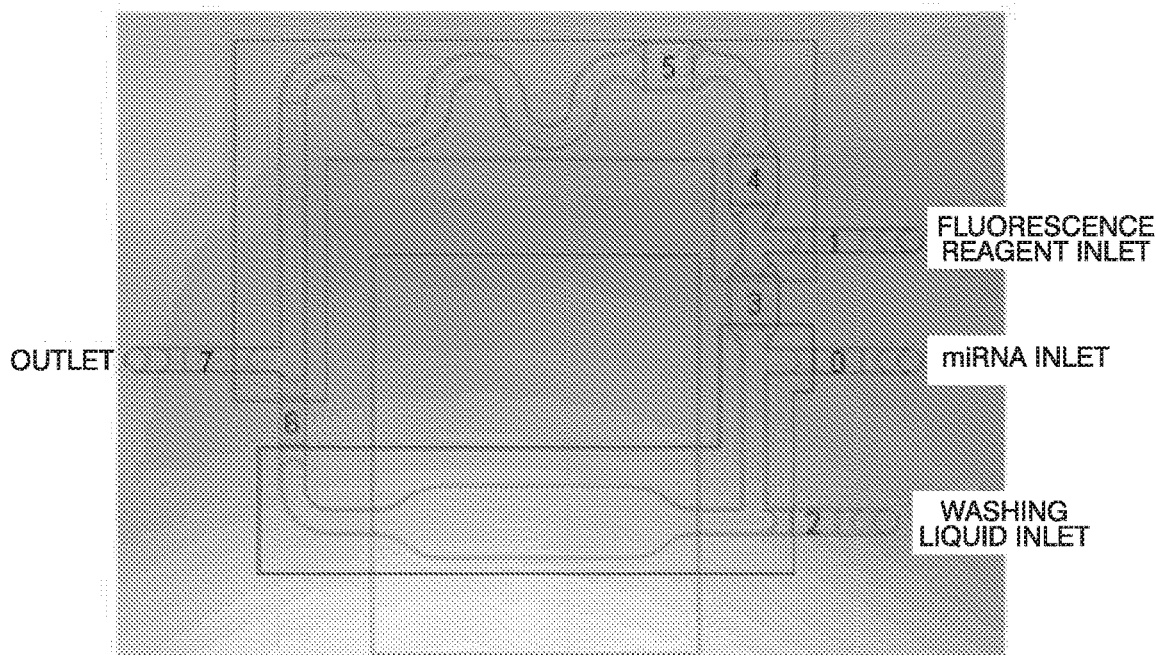

VALVES 0, 1, 2, 6, 7:
WIDTH OF 1 mm, HEIGHT OF 200 μm

VALVES 3, 4, 5:
WIDTH OF 2 mm, HEIGHT OF 400 μm

▭ INLET 1 SOLUTION INTRODUCTION SECTION (20 μl)

▭ INLET 2 SOLUTION INTRODUCTION SECTION (20 μl)

SOLUTION MIXER, FLUIDIC DEVICE, AND SOLUTION MIXING METHOD

CROSS-REFERENCE TO RELATED APPLICATION

Priority is claimed on Japanese Patent Application No. 2013-199071, filed Sep. 25, 2013. This application is a divisional application of U.S. application Ser. No. 15/078,840, filed Mar. 23, 2016, which is a continuation application of International Patent Application No. PCT/JP2014/075312, filed on Sep. 24, 2014. The contents of the above-mentioned application are incorporated herein by reference.

REFERENCE TO SEQUENCE LISTING SUBMITTED VIA EFS-WEB

This application is being filed electronically via EFS-Web and includes an electronically submitted sequence listing in .txt format. The .txt file contains a sequence listing entitled "OSP62359SequenceListing_v2.txt" created on Mar. 22, 2016 and is 7667 bytes in size. The sequence listing contained in this .txt file is part of the specification and is incorporated herein by reference in its entirety.

BACKGROUND

The present invention relates to a solution mixer, a fluidic device, and a solution mixing method.

In recent years, development of micro-total analysis systems (μ-TAS) or the like which aims at increasing speed, increasing efficiency, and integration of experiments in the in vitro diagnostic field, or ultra-miniaturization of a testing device has attracted attention, and active research has been underway globally.

It is possible to measure or analyze a small amount of sample using the μ-TAS which is portable and is disposable at low costs, and therefore, the μ-TAS is excellent compared to testing devices in the related art.

Furthermore, in a case of using an expensive reagent or in a case of testing a small amount of multiple specimens, the μ-TAS has attracted attention as a method with high usefulness.

As a constituent of the μ-TAS, a rotary mixer which includes a loop-like flow path and a pump, which is disposed on the flow path, is reported (Jong Wook Hong, Vincent Studer, Giao Hang, W French Anderson and Stephen R Quake, Nature Biotechnology 22, 435-439 (2004)). In this rotary mixer, a plurality of solutions are injected into the loop-like flow path, and are mixed together in the loop-like flow path by operating the pump. The plurality of solutions are loaded in an injection flow path which is connected to the loop-like flow path, and are then injected into the loop-like flow path. Valves are provided on the injection flow path, and the volume of each of the solutions is quantitatively determined within the flow path.

SUMMARY

In a method disclosed in Hong et al, a plurality of solutions to be mixed in a loop-like flow path are first loaded and quantitatively determined in an injection flow path, and are then injected into the loop-like flow path.

In general, when injecting a solution into a flow path, if trying to fill the flow path completely with the solution without air being mixed, it is necessary to inject a larger amount of solution than the volume within the flow path unless the injection is stopped simultaneously with the completion of discharge of air. The same principle applies to the rotary mixer disclosed in Hong et al., and it is necessary to inject a larger amount of plurality of solutions to be mixed in the above-described loop-like flow path than the volume within the loop-like flow path. Accordingly, even if the volume of solutions to be used for mixing is quantitatively determined within an injection flow path, when actually mixing the solutions within the loop-like flow path, there is a concern that the quantitative determination may not always be accurate.

The present invention has been made in consideration of the above-described circumstances, and an object of the present invention is to provide a solution mixer which can accurately and quantitatively determine the volume of each of the solutions to be mixed in the mixer, a fluidic device including the solution mixer, and a solution mixing method.

The present inventors have conducted extensive studies in order to solve the above-described problems, and as a result, they have found that it is possible to quantitatively determine and mix solutions which have been injected into a main flow path by quantitatively compartmentalizing the main flow path having an arbitrary volume, using a valve. An embodiment of the present invention provides the following (1) to (5).

(1) A solution mixer in an embodiment of the present invention comprising: a main flow path in which a solution circulates;

at least one solution introduction flow path connected to the main flow path; and at least one solution discharge flow path connected to the main flow path, wherein the solution discharge flow path has at least one solution discharge flow path valve, and wherein the main flow path has at least one main flow path valve.

(2) A fluidic device in an embodiment of the present invention comprising the above-described solution mixer.

(3) A method of mixing two types of solutions with each other in an embodiment of the present invention using a solution mixer, wherein the solution mixer includes a main flow path in which a solution circulates, a solution introduction flow path connected to the main flow path, and a solution discharge flow path connected to the main flow path, in which the solution discharge flow path has at least one solution discharge flow path valve, the main flow path has at least one main flow path valve, and the at least one main flow path valve is disposed in the vicinity of the solution discharge flow path, and wherein the method comprises a step A of sending a first solution to the main flow path from the solution introduction flow path, while the main flow path valve and the solution discharge flow path valve are open;

a step B of closing the main flow path valve;

a step C of sending a second solution to the main flow path from the solution introduction flow path;

a step D of closing the solution discharge flow path valve; and a step E of circulating and mixing the first solution and the second solution by opening the main flow path valve.

(4) A method of mixing a plurality of solutions with each other in an embodiment of the present invention using a solution mixer, wherein the solution mixer includes a first flow path, a second flow path, and first and second connecting flow paths which respectively allow communication with the first flow path and the second flow path, first and second solution introduction flow paths which are respectively connected to the first and second flow paths, first and second solution discharge flow paths which are respectively connected to the first and second flow paths, first and second solution discharge flow path valves which are respectively disposed in the first and second solution discharge flow paths, and first and second main flow path valves which are respectively disposed in the first and second connecting flow paths, and wherein the method comprises a step A of introducing a first solution into the first flow path from the first solution introduction flow path and introducing a second solution into the second flow path from the second solution introduction flow path, while the first and second main flow path valves are closed and the first and second solution discharge flow path valves are open; and a step B of circulating and mixing the first and second solutions by closing the first and second solution discharge flow path valves and opening the first and second main flow path valves.

(5) A method of mixing a plurality of solutions with each other in an embodiment of the present invention using a solution mixer, wherein the solution mixer includes two or more main flow paths, in which a solution circulates, each of the main flow paths including a first flow path, a second flow path, and first and second connecting flow paths which allow communication with the first flow path and the second flow path, and the two adjacent main flow paths sharing the first flow path or the second flow path, at least one solution introduction flow path which is connected to each of the main flow paths, and at least one solution discharge flow path which is connected to each of the main flow paths, wherein each of the solution discharge flow paths has at least one solution discharge flow path valve, wherein each of the connecting flow paths has at least one main flow path valve, wherein each of the valves is disposed such that each partial region of the main flow paths which is defined by closing each of the valves has a predetermined volume, and wherein the method comprises a step of respectively introducing a first solution and a second solution into the first flow path and the second flow path after closing the main flow path valves and the solution discharge flow path valves such that the first flow path and the second flow path of one main flow path are isolated from each other and from other flow paths;

a step of circulating and mixing the first solution and the second solution by opening the main flow path valves such that the first flow path and the second flow path communicate with each other;

a step of closing the main flow path valves and the solution discharge flow path valves such that, in a main flow path next to the one main flow path, a first or second flow path, which is not shared with the one main flow path, is isolated from other flow paths, and introducing a third solution into the isolated first or second flow path, and a step of circulating and mixing the third solution with a mixed solution of the first solution and the second solution by opening the main flow path valves such that the main flow path and the neighboring main flow path are allowed to communicate with each other.

According to the present invention, it is possible to mix a plurality of solutions with each other in a solution mixer in a state in which the volume of the plurality of solutions are accurately and quantitatively determined.

BRIEF DESCRIPTION OF THE DRAWINGS

FIG. 15A is a schematic view of an aspect of a solution mixing method (step F) in the present embodiment.

FIG. 15B is a schematic view of an aspect of a solution mixing method (step G) in the present embodiment.

FIG. 19 is a result of detection of miRNA using a fluidic device which has a detection unit including a substrate to which a probe complementary to miRNA is immobilized in Example.

FIG. 21A is a result showing the detail of controlling a valve in a fluidic device in Example.

FIG. 21B is a result showing the detail of controlling a valve in the fluidic device in Example.

DESCRIPTION OF EMBODIMENTS

<<Solution Mixer>>

First Embodiment

A solution mixer of the present embodiment includes: a main flow path in which a solution circulates; a solution introduction flow path connected to the main flow path; and a solution discharge flow path connected to the main flow path. The solution discharge flow path has a solution discharge flow path valve for opening and closing the solution discharge flow path, the main flow path has a first main flow path valve for quantitatively compartmentalizing the main flow path, the first main flow path valve is disposed in the vicinity of the solution discharge flow path, the main flow path includes a second main flow path valve for quantitatively compartmentalizing the main flow path, and the second main flow path valve is disposed in the vicinity of the solution introduction flow path.

Figure 1:
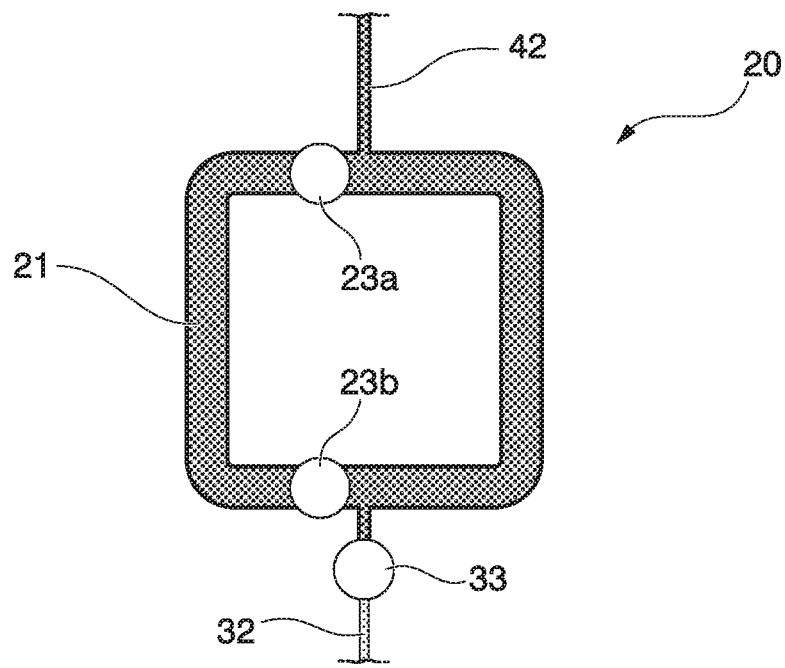
FIG. 1 is a schematic view of an aspect of a solution mixer in the present embodiment.

FIG. 1 is a schematic view showing a basic configuration of a solution mixer 20 of the present embodiment. The solution mixer of the present embodiment includes: a main flow path 21 in which a solution circulates; a solution introduction flow path 42 connected to the main flow path; and a solution discharge flow path 32 connected to the main flow path. A solution discharge flow path valve 33 for opening and closing the solution discharge flow path 32 is provided in the solution discharge flow path 32. A first main flow path valve 23b for quantitatively compartmentalizing the main flow path 21 is provided in the main flow path 21. The first main flow path valve 23b is disposed in the vicinity of the solution discharge flow path 32. The main flow path further includes a second main flow path valve 23a for quantitatively compartmentalizing the main flow path 21. The second main flow path valve 23a is disposed in the vicinity of the solution introduction flow path 42. The number of the solution introduction flow path 42 and the number of the solution discharge flow path 32 are not particularly limited. However, the solution mixer 20 shown in FIG. 1 includes one solution introduction flow path 42 and one solution discharge flow path 32.

The solution mixer 20 of the present embodiment has the main flow path valves 23. The main flow path 21, which is compartmentalized by putting the main flow path valves 23 into a closed state, becomes flow paths each of which has an independent volume. In addition, it is possible to control discharge of air or the like in the main flow path 21 and filling with a solution, by operating the opening and the closing of the solution discharge flow path valve 33.

The solution mixer 20 of the present embodiment has the main flow path 21 of which the volume within the flow path has already been determined. Therefore, it is possible to mix solutions in a state in which the volume of the solutions, with which the main flow path 21 compartmentalized by the main flow path valves 23 is filled, is accurately quantified. After the solutions are sent to the flow paths and the volume of the solutions is quantitatively determined, the compartmentalized flow paths communicate with each other by opening the main flow path valves 23, and therefore, it becomes possible to mix the solutions.

In this manner, as the main flow path 21 can be used in mixing solutions as well as in quantitatively determining solutions, it is possible to simultaneously perform injection of solutions into mixer and quantitative determination of solutions, and therefore, it is possible to promote efficiency of an operation.

Second Embodiment

Figure 2:
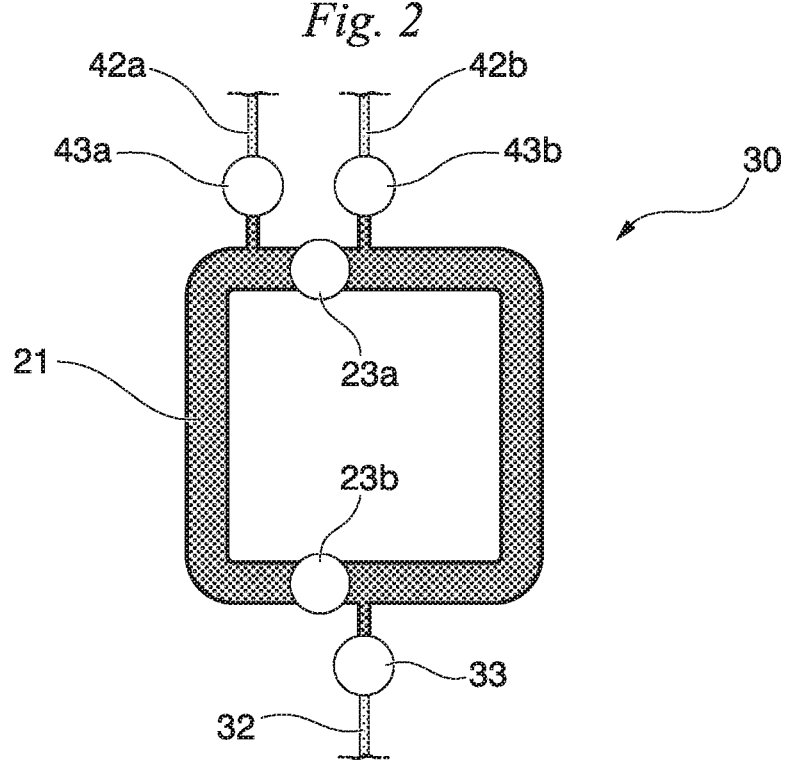
FIG. 2 is a schematic view of an aspect of a solution mixer in the present embodiment.

A solution mixer of the present embodiment further has solution introduction flow path valves for opening and closing the solution introduction flow paths, in the configuration of the solution mixer of the above first embodiment. The solution mixer of the present embodiment includes: a first introduction flow path through which a first solution is introduced; and a second introduction flow path through which a second solution is introduced, as the solution introduction flow path. FIG. 2 is a schematic view showing a basic configuration of a solution mixer 30 of the present embodiment. The solution mixer 30 further has solution introduction flow path valves 43 for opening and closing the solution introduction flow paths 42. The solution mixer includes: a first introduction flow path 42a through which the first solution is introduced, and a second introduction flow path 42b through which the second solution is introduced, as the solution introduction flow paths. By providing the solution introduction flow path valves 43, the main flow path 21 can be completely compartmentalized by the solution introduction flow path valves 43 and a solution discharge valve 33. Accordingly, in a case where the solution introduction flow path valves 43 and the solution discharge flow path valve 33 are closed and the main flow path valves 23 are open, mixing of solutions is more efficiently realized within the main flow path 21 which is closed by the solution introduction flow path valves 43 and the solution discharge flow path valve 33.

In addition, by providing the first introduction flow path 43a through which a first solution is introduced and the second introduction flow path 43b through which a second solution is introduced, as the solution introduction flow paths in the solution mixer 30, it is possible to individually introduce solutions, which are different from each other, into the main flow path 21 which is compartmentalized by the main flow path valves 23. Accordingly, it is preferable that the second main flow path valve 23a is disposed between the first introduction flow path 42a, and the second introduction flow path 42b through which the second solution is introduced, as shown in FIG. 2.

Third Embodiment

Figure 3:
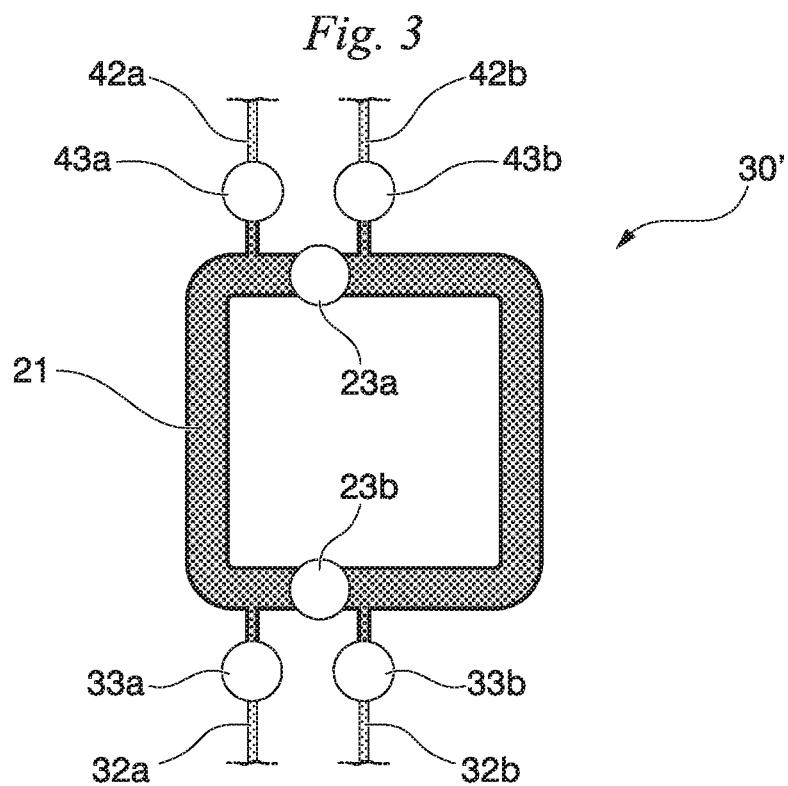
FIG. 3 is a schematic view of an aspect of a solution mixer in the present embodiment.

The configuration of a solution mixer 30' of the present embodiment is shown in FIG. 3. The solution mixer 30' of the present embodiment includes: a first discharge flow path 32a through which a first solution is discharged; and a second discharge flow path 32b through which a second solution is discharged, as the solution discharge flow paths 32, in the configuration of the solution mixer 30 of the above second embodiment. In addition, as shown in FIG. 3, it is preferable that the first main flow path valve 23b is disposed between the first discharge flow path 32a through which a first solution is discharged and the second discharge flow path 32b through which a second solution is discharged. The solution mixer 30' of the present embodiment having such a configuration can individually control the discharge of air or the like in the main flow path, filling of the solutions, and the like with respect to each of the first solution and the second solution which are introduced into the main flow path 21 which is compartmentalized by the main flow path valves 23, through an operation of opening and closing the solution discharge flow path valve 33a or 33b.

Fourth Embodiment

Figure 4:
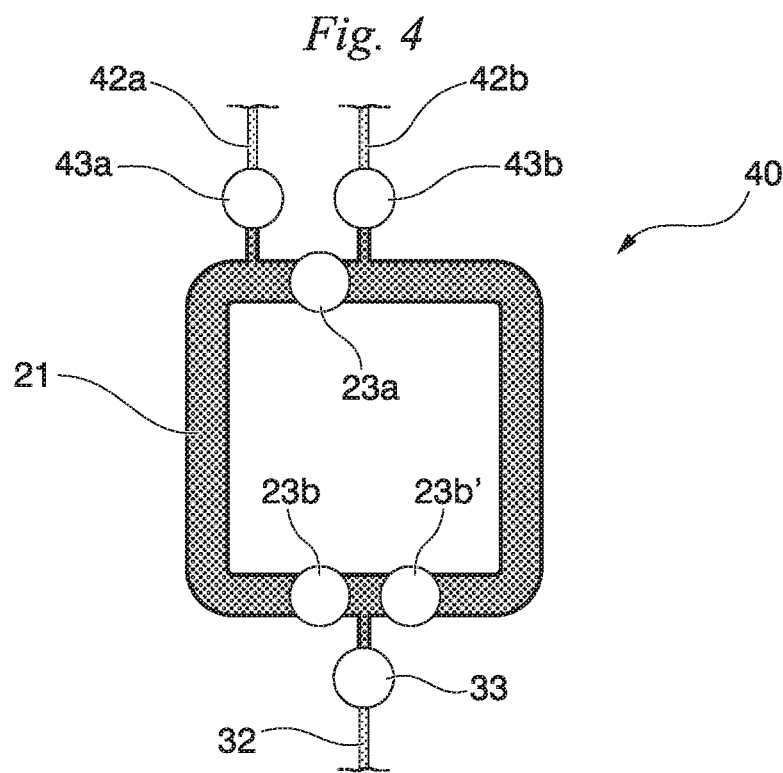
FIG. 4 is a schematic view of an aspect of a solution mixer in the present embodiment.

A solution mixer of the present embodiment includes: a third main flow path valve for quantitatively compartmentalizing the main flow path. The third main flow path valve is in the vicinity of the solution discharge flow path which is connected between the first main flow path valve and the third main flow path valve. The view schematically showing the solution mixer of the present embodiment is shown in FIG. 4. A solution mixer 40 of the present embodiment includes: a third main flow path valve 23b' for quantitatively compartmentalizing the main flow path 21. The third main flow path valve 23b' is in the vicinity of the solution discharge flow path 32 which is connected between the first main flow path valve 23b and the third main flow path valve 23b'. The solution mixer 40 of the present embodiment having such a configuration can individually control the discharge of air or the like in the main flow path, filling of the solutions, and the like with respect to the solutions within the main flow path 21 which is compartmentalized by the main flow path valves 23. For example, when the main flow path 21 is in a state of being filled with solutions, it is possible to discharge a solution in a flow path which is compartmentalized by the main flow path valves 23a and 23b', out of the solutions with which the main flow path 21 is filled, through the solution discharge flow path 32 by closing the first main flow path valve 23b and the second main flow path valve 23a and opening the third main flow path valve 23b' and the solution discharge valve 33.

Fifth Embodiment

In a solution mixer of the present embodiment, the main flow path includes a first flow path, a second flow path, and a connecting flow path which allows communication between the first flow path and the second flow path. The connecting flow path has the first main flow path valve.

Figure 5:
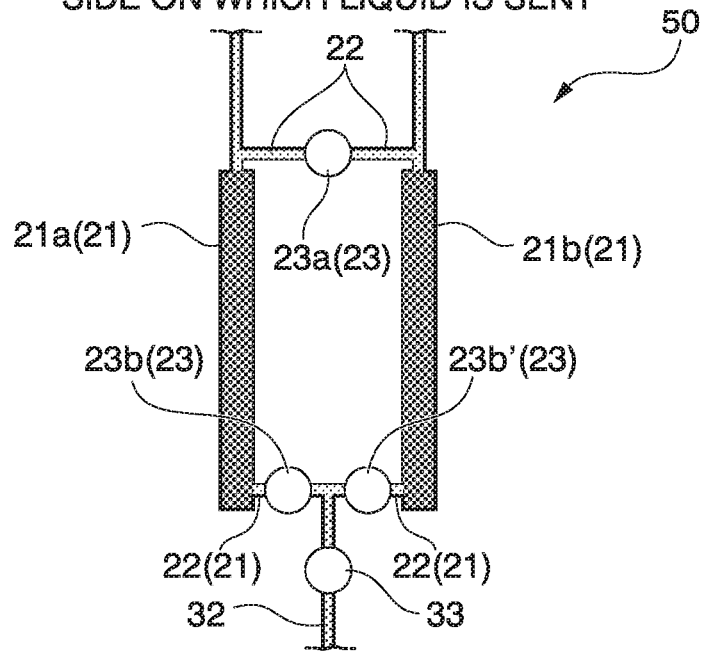
FIG. 5 is a schematic view of an aspect of a solution mixer in the present embodiment.

The schematic view showing a basic configuration of the solution mixer of the present embodiment is shown in FIG. 5. In a solution mixer 50, the main flow path 21 includes a first flow path 21a, a second flow path 21b, and connecting flow paths 22 which allows communication between the first flow path 21a and the second flow path 21b. The connecting flow paths 22 have the first main flow path valve 23b. In addition, it is preferable that the solution mixer 50 of the present embodiment includes the second main flow path valve 23a and the third main flow path valve 23b' as shown in FIG. 5.

By allowing communication between the plurality of flow paths represented by the first flow path 21a and the second flow path 21b using the connecting flow paths 22, it becomes easy to sequentially mix a plurality of solutions as will be described in the second embodiment in the "Solution Mixing Method" to be described below.

Sixth Embodiment

Figure 6:
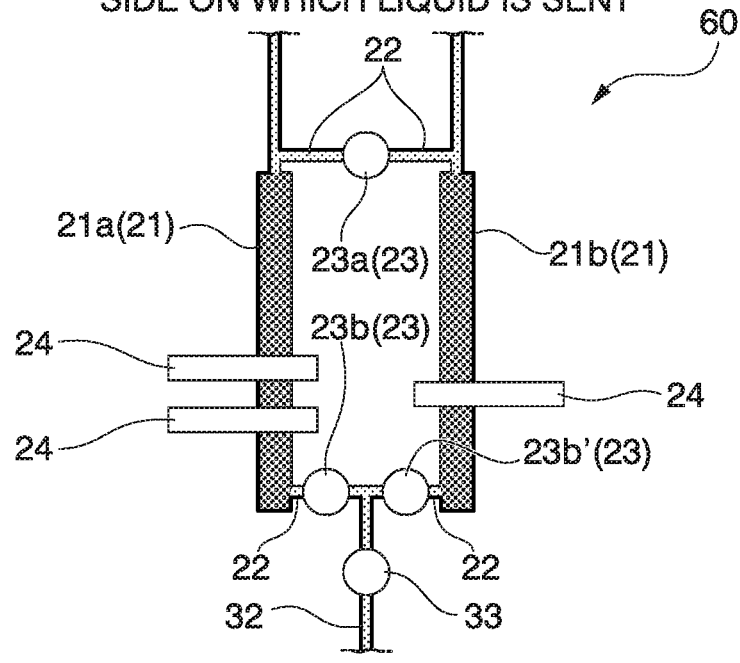
FIG. 6 is a schematic view of an aspect of a solution mixer in the present embodiment.

A solution mixer of the present embodiment further includes a pump in the solution mixer 50 of the fifth embodiment which has been described above. In addition, it is preferable that the pump is a pump valve which can send a solution in accordance with opening and closing of the valve. FIG. 6 is a view schematically showing the solution mixer of the present embodiment. A solution mixer 60 includes pump valves 24, and the pump is constituted of three pump valves 24. The number of pump valves 24 may be greater than or equal to four. By disposing the pumps in the main flow path 21, more efficient rotary mixing is realized. The main flow path valves 23 may be used as the pump valves.

Seventh Embodiment

Figure 7:
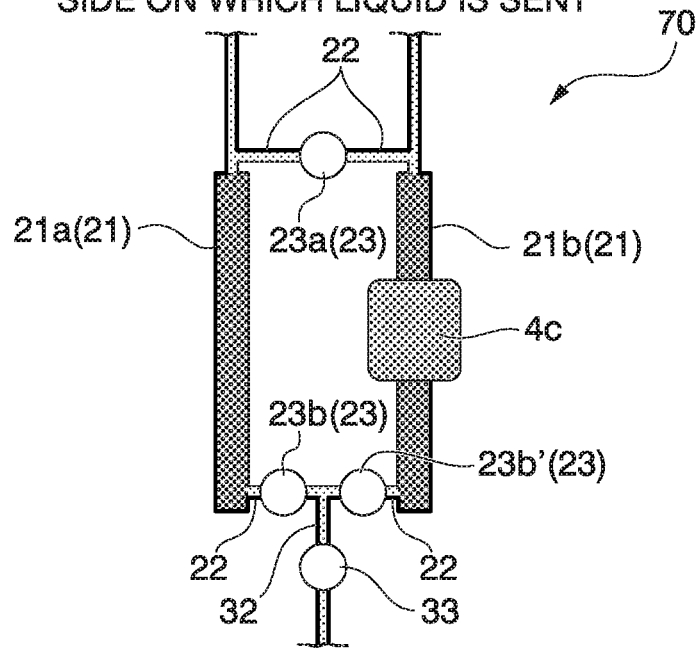
FIG. 7 is a schematic view of an aspect of a solution mixer in the present embodiment.

A solution mixer of the present embodiment includes a detection unit of a mixed solution of the first solution and the second solution. FIG. 7 is a view of schematically showing the solution mixer of the present embodiment. A solution mixer 70 further includes: a detection unit 4c in the solution mixer 50 of the fifth embodiment which has been described above.

The detection unit 4c increases the opportunity of contact with a molecule contained in a solution by circulatory mixing the solution within the main flow path 21 of the solution mixer 70.

It is preferable that the detection unit 4c included in the fluidic device of the present embodiment includes a substrate to which a substance having affinity to the molecule (biomolecule) is immobilized. In a case where the biomolecule is a nucleic acid, it is preferable that the detection unit 4c includes a substrate 136 to which a probe complementary to a target nucleic acid is immobilized. In a case where the biomolecule is a miRNA, it is preferable that the detection unit includes substrate 136 to which a probe complementary to target miRNA is immobilized (refer to FIG. 22). In a case where the biomolecule is a protein, it is preferable that the substrate 136 is a protein array. Examples of the substrate to which a probe complementary to target miRNA is immobilized include a DNA chip which is known in the related art.

Furthermore, it is preferable that the detection unit 4c includes the following configuration from the viewpoint of specifically detecting target miRNA with high sensitivity.

Figure 22:
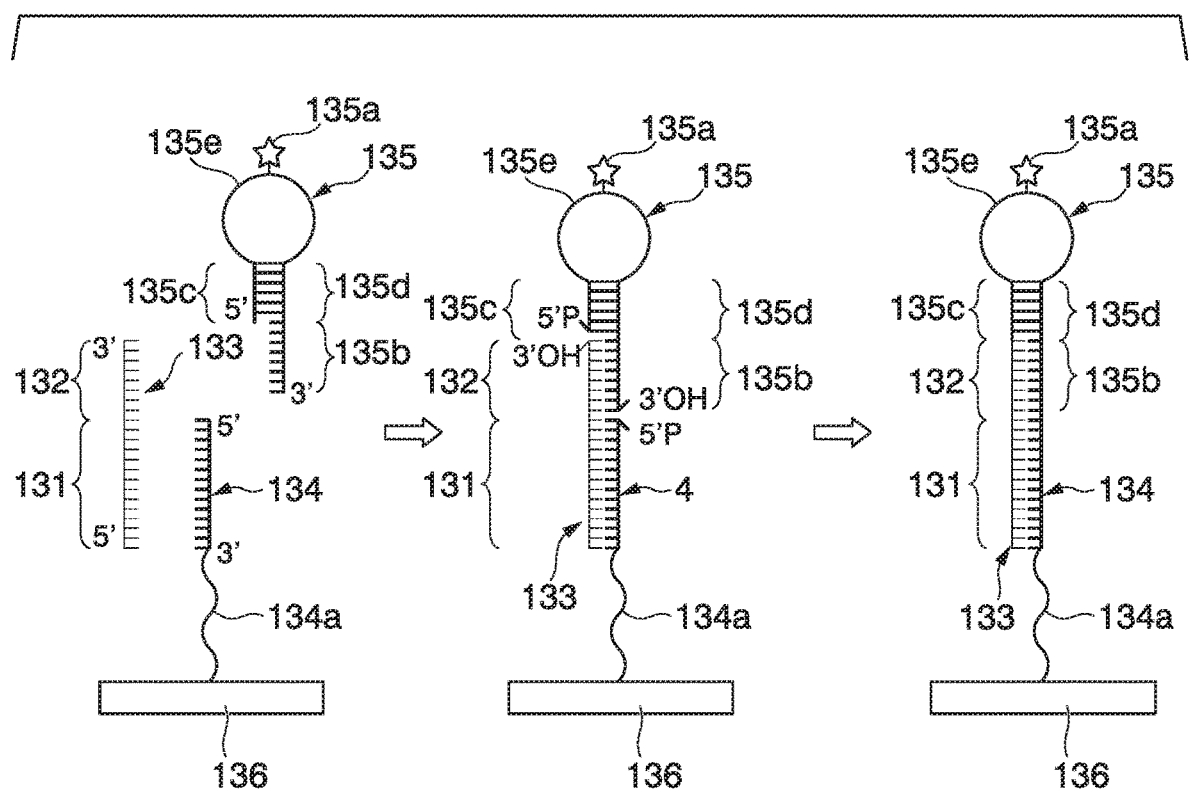
FIG. 22 is a schematic view of an aspect of a substrate of the fluidic device in the present embodiment.

In a case where target miRNA 133 includes a first section 131 and a second section 132 as shown in FIG. 22, it is preferable that the detection unit 4c includes a substrate to which a capture probe 134 including a sequence which can be hybridized with the first section 131 is immobilized.

A detection probe 135 includes: two stem sections 135c and 135d forming a double stranded structure; a loop section 135e which is a region between the two stem sections 135c and 135d and is labeled using a labeling substance 135a; and a sequence 135b that can be hybridized with the second section 132 in a case where the target miRNA 133 includes the first section 131 and the second section 132, and the detection probe has a 5'-protruding end or a 3'-protruding end.

The capture probe 134 and the detection probe 135 can respectively be hybridized with the first section 131 and the second section 132 of the miRNA 133. For this reason, the length of the first section 131 and the length of the second section 132 are preferably 5 bases to 17 bases, and more preferably 7 bases to 15 bases from the viewpoint of the number of bases in which miRNA formed of about 22 bases is divided into two.

In the present embodiment, the section on the 5' side of the miRNA 133 is regarded as the first section 131 and the section on the 3' side of the miRNA 133 is regarded as the second section 132.

The expression "can be hybridized" in the present invention and in the present specification means that a part of a capture probe and a part of a detection probe which are used in the present invention are hybridized with a target nucleic acid (target miRNA) under stringent conditions, but are not hybridized with nucleic acid molecule other than the target nucleic acid (target miRNA). Examples of the "stringent conditions" include conditions disclosed in Molecular Cloning-A Laboratory Manual, Third Edition (Sambrook et al., Cold Spring Harbor Laboratory Press).

The capture probe 134 includes a sequence which can be hybridized with the first section 131 of the miRNA 133 in a 5'-end region.

It is preferable that the capture probe 134 does not include a sequence complementary to the second section 132 of the miRNA 133 so as not to be hybridized with the second section 132 of the miRNA 133 from the viewpoint of quantitatively determining the miRNA 133 with high accuracy.

Molecular degrees of freedom are required in order for the capture probe 134 which has been immobilized to the substrate 136 to be hybridized with the miRNA 133. Therefore, it is preferable that the capture probe 134 has a spacer 134*a*, which is bound to the substrate 136, at the 3'-end. The length of the spacer 134*a* is not particularly limited, but is preferably 3 bases to 50 bases and more preferably 5 bases to 25 bases. However, a base to be used for the spacer can be replaced with a linker such as PEG which has the same length and the same flexibility as that of the base. In that case, the number of bases to be used for the spacer 134*a* may be 0.

The length of the capture probe 134 is not particularly limited as long as the length is a length required for functioning as a probe, but is preferably 3 bases to 50 bases and more preferably 5 bases to 40 bases in consideration of the number of bases of the first section 131 and the spacer 134*a*.

The capture probe 134 may be DNA or RNA. The capture probe is not limited to be a natural one or a non-natural one as long as the probe has the same function as that of DNA or RNA and may be one containing an artificial nucleic acid such as a peptide nucleic acid (PNA), a locked nucleic acid (LNA), and a bridged nucleic acid (BNA). It is preferable that the capture probe 134 contains an LNA or a BNA from the viewpoint of higher affinity to the target miRNA 133, being more hardly recognized by DNase or RNase, and being more capable of becoming a substrate of DNA ligase such as T4 DNA ligase, compared to DNA or RNA.

Examples of the substrate 136 used for immobilizing the capture probe 134 include a glass substrate, a silicon substrate, a plastic substrate, and a metal substrate. Examples of the method of immobilizing the capture probe 134 on the substrate 136 include a method of immobilizing a probe on a substrate at high density using a photolithographic technology or a method of immobilizing a probe on a glass substrate or the like through spotting.

In the present embodiment, the detection probe 135 includes the sequence 135*b* which can be hybridized with the second section 132 of the miRNA 133 in a 3'-end region.

It is preferable that the detection probe 135 does not contain a sequence complementary to the first section 131 of the miRNA 133 so as not to be hybridized with the first section 131 of the miRNA 133, from the viewpoint of quantitatively determining the miRNA 133 with high accuracy.

The detection probe 135 forms a stem loop structure. The stem loop structure refers to, when there are complementary sequences at two regions which are distant from each other within a single strand nucleic acid molecule, formation of a double stranded structure (stem structure) through an interaction between base pairs of nucleic acids and formation of a loop structure by a sequence which is between the two regions. The stem loop structure is also called a hairpin loop.

In the present embodiment, the detection probe 135 is constituted of: the two stem sections 135*c* and 135*d* forming a double stranded structure; the loop section 135*e* which is a region between the two stem sections 135*c* and 135*d*; and the sequence 135*b* that can be hybridized with the second section 132, from the 5'-end side. That is, the detection probe 135 has a 3' protruding end. The detection probe has a protruding end, and whether the protruding end included in the detection probe is the 5'-protruding end or the 3'-protruding end depends on whether the capture probe and the substrate bind to each other through the 5'-end of the capture probe or through the 3'-end of the capture probe.

The length of a stem section in the detection probe 135 is determined by a balance with the length of a loop section. The length thereof is not particularly limited as long as the length thereof is a length in which the detection probe 135 can stably form a stem loop structure, and is preferably 3 bases to 50 bases and more preferably 5 bases to 20 bases.

The length of a loop section in the detection probe 135 is determined by a balance with the length of a stem section. The length thereof is not particularly limited as long as the length thereof is a length in which the detection probe 135 can stably form a stem loop structure, and is preferably 3 bases to 200 bases and more preferably 5 bases to 100 bases.

The length of the detection probe 135 is not particularly limited as long as the length thereof is a length in which it is possible to form a stem loop structure and which is required for functioning as a probe, and is preferably 14 bases to 200 bases and more preferably 24 bases to 150 bases in consideration of the number of bases of the second section 132 and the number of bases required for forming a stem loop structure.

The detection probe 135 may be DNA or RNA. The capture probe is not limited to be a natural one or a non-natural one as long as the probe has the same function as that of DNA or RNA and may be one containing an artificial nucleic acid such as a peptide nucleic acid (PNA), a locked nucleic acid (LNA), and a bridged nucleic acid (BNA). It is preferable that the detection probe 135 contains an LNA or a BNA from the viewpoint of higher affinity to the target miRNA, being more hardly recognized by DNase or RNase, and being more capable of becoming a substrate of DNA ligase such as T4 DNA ligase, compared to DNA or RNA.

It is preferable that at least any one of the capture probe 134 and the detection probe 135 contains an LNA or a BNA and it is more preferable that both of the capture probe 134 and the detection probe 135 contain an LNA or a BNA.

The detection probe 135 is labeled by the labeling substance 135*a*. Examples of the labeling substance include fluorescent pigments, fluorescent beads, quantum dots, biotin, antibodies, antigens, energy absorption materials, radioisotopes, chemiluminescent bodies, and enzymes.

Examples of the fluorescent pigments include carboxyfluorescein (FAM), 6-carboxy-4',5'-dichloro-2', 7'-dimethoxy fluorescein (JOE), fluorescein isothiocyanate (FITC), tetrachloro fluorescein (TET), 5'-hexachloro-fluorescein-CE phosphoroamidite (HEX), Cy3, Cy5, Alexa 568, and Alexa 647.

In the total RNA, there is only a minute amount of miRNA, and therefore, it is difficult to label the miRNA at high efficiency without fractionating the miRNA. In contrast, in the present embodiment, a detection probe which has been previously labeled is used, and therefore, it is possible to detect the miRNA with high sensitivity.

According to the present embodiment, solutions which are brought into contact with a detection unit are accurately and quantitatively determined, and therefore, it is possible to realize accurate analysis.

Eighth Embodiment

In a solution mixer of the present embodiment, the main flow path includes an agitating structure. Examples of the agitating structure include a structure having a curvature. In the structure having a curvature, the flow velocity near the wall surface becomes slow by the interaction (friction) between solutions and the wall surface of the flow path within the flow path and the flow velocity in the center of the flow path becomes fast. As a result, it is possible to distribute solutions in accordance with the flow velocity of a liquid, and therefore, the mixing of the solutions is promoted. Examples of the inner diameter of the flow path include 0.01 mm to 3 mm or 0.5 mm to 1 mm.

Figure 8:
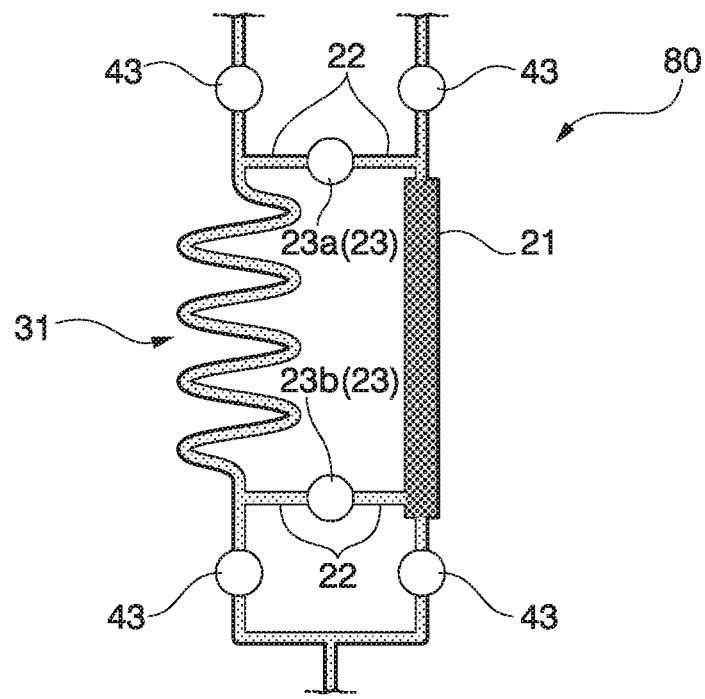
FIG. 8 is a schematic view of an aspect of a solution mixer in the present embodiment.

In addition, the structure having a curvature may be included in a folded structure. FIG. 8 is a view schematically showing a solution mixer 80 of the present embodiment. In the solution mixer 80, the main flow path includes a folded structure 31. Here, the "folded structure" refers to a structure in which a flow path turns about 180 degrees to the direction perpendicular to the major axis direction of the flow path which becomes a reference line.

The number of times of the folding can be counted by the number of times of the change in the direction in which the flow path extends, and the number of times of the folding in the folded structure 31 shown in FIG. 8 is eight. In the folded structure, the difference in the above-described flow velocity is repeatedly caused, and therefore, the mixing of solutions is further promoted.

<<Fluidic Device>>

First Embodiment

The fluidic device of the present embodiment includes the solution mixer which has been described above.

It is preferable that the fluidic device of the present embodiment is a device which detects a biomolecule contained in an exosome in a sample. The exosome is a small lipid vesicle having a diameter of 30 nm to 100 nm, and is secreted as a fused body of an endosome and a cell membrane in a body fluid such as blood, urine, or saliva from various cells such as a tumor cell, a dendritic cell, a T cell, or a B cell.

Abnormal cells such as cancer cells express a specific protein, a specific nucleic acid, microRNA, or the like in the inside of a cell membrane. An exosome secreted in a body fluid also expresses a microRNA derived from a cell as a secretion source. For this reason, it is expected that a technology which makes it possible to examine an abnormality within a living body by analyzing a biomolecule existing inside a membrane of an exosome in a body fluid, even without performing a biopsy examination, is established. The biopsy examination refers to a clinical examination in which diagnosis or the like of a disease is examined by observing a lesion site using a microscope after collecting a tissue of the lesion site.

Second Embodiment

Figure 9:
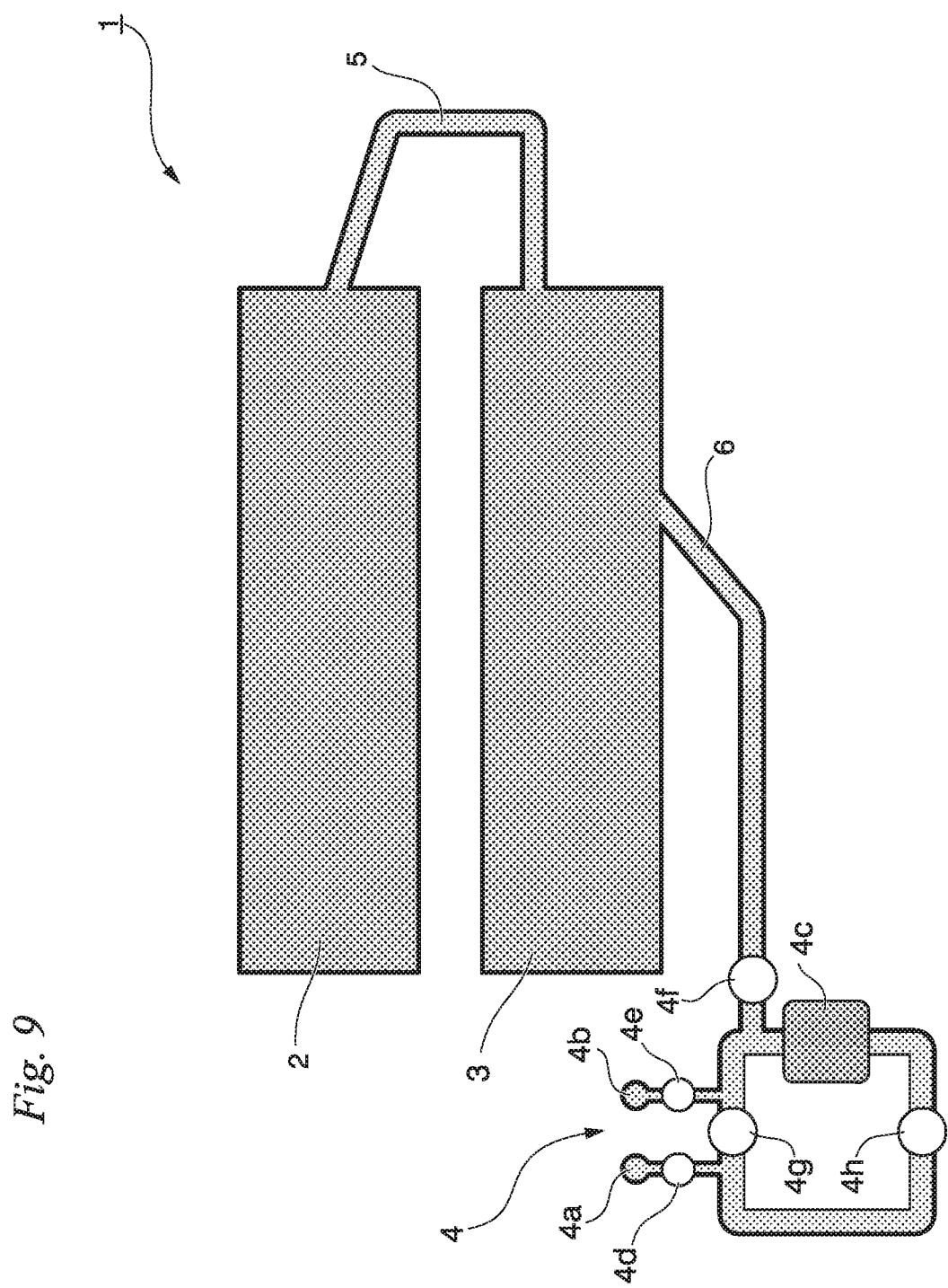
FIG. 9 is a schematic view of an aspect of a fluidic device in the present embodiment.

As shown in FIG. 9, a fluidic device 1 of the present embodiment includes: an exosome purification unit 2 which has a layer modified with a compound having a hydrophobic chain and a hydrophilic chain; a biomolecule purification unit 3; a solution mixer 4; a detection unit 4c; a first flow path 5 which connects the exosome purification unit 2 to the biomolecule purification unit 3; and a second flow path 6 which connects the biomolecule purification unit 3 to the solution mixer 4.

Figure 10:
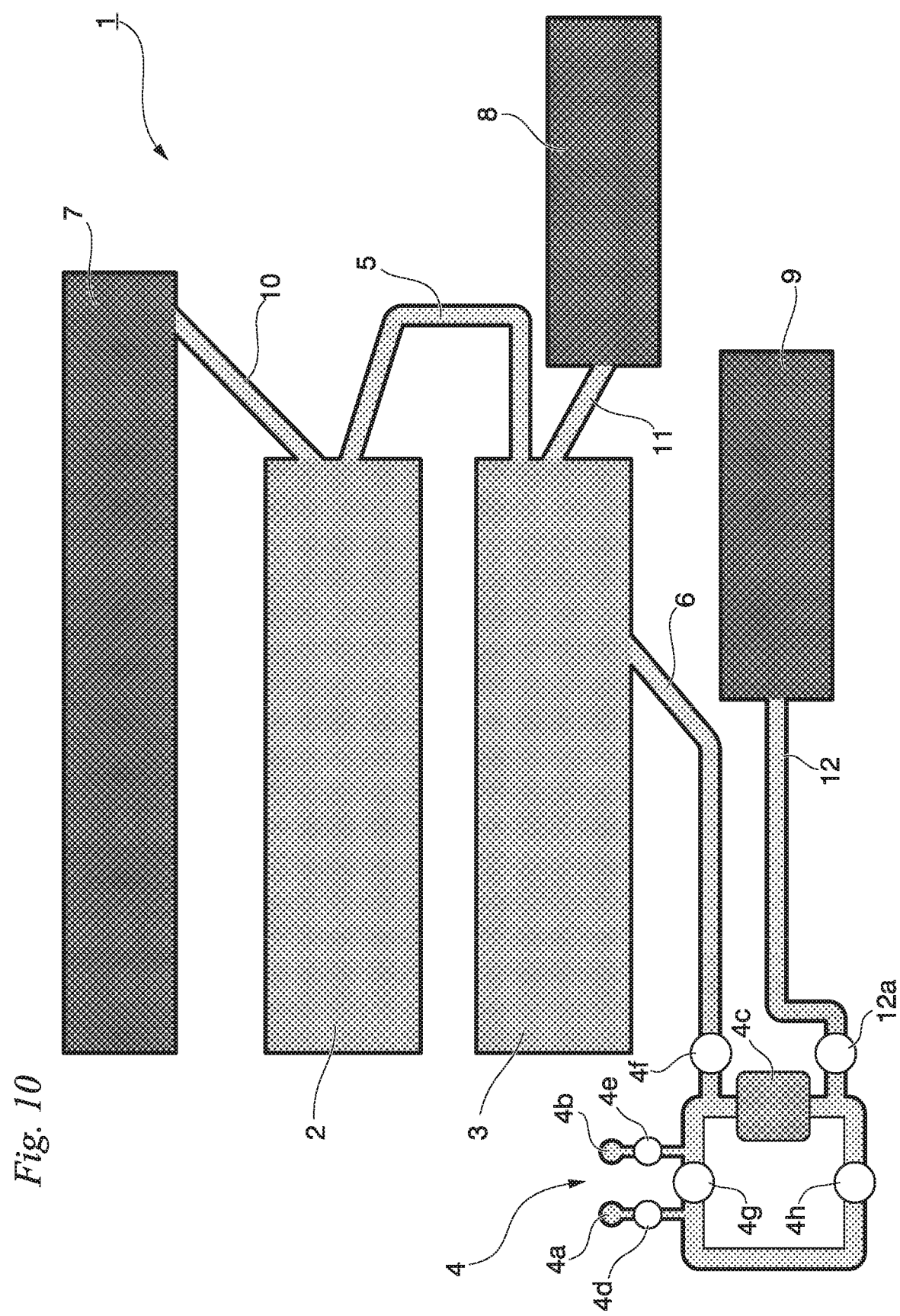
FIG. 10 is a schematic view of an aspect of the fluidic device in the present embodiment.

It is preferable that the fluidic device 1 of the present embodiment further includes a waste liquid tank from the viewpoint of preventing a secondary infection due to a sample used in analysis. For example, as shown in FIG. 10, a micro flow path device (fluidic device 1) of the present embodiment includes a first waste liquid tank 7, a second waste liquid tank 8, and a third waste liquid tank 9, and preferably includes: a third flow path 10 which connects the first waste liquid tank 7 and the exosome purification unit 2; a fourth flow path 11 which connects the second waste liquid tank 8 to the biomolecule purification unit 3; and a fifth flow path 12 which connects the third waste liquid tank 9 to the solution mixer 4. There are three waste liquid tanks shown in FIG. 10. However, the waste liquid tanks may be combined in one or two waste liquid tanks.

As will be described below, a waste liquid from the exosome purification unit 2 is sent to the first waste liquid tank 7 through the third flow path 10. A waste liquid from the biomolecule purification unit 3 is sent to the second waste liquid tank 8 through the fourth flow path 11. A waste liquid from the solution mixer 4 is sent to the third waste liquid tank 9 through the fifth flow path 12.

Figure 11:
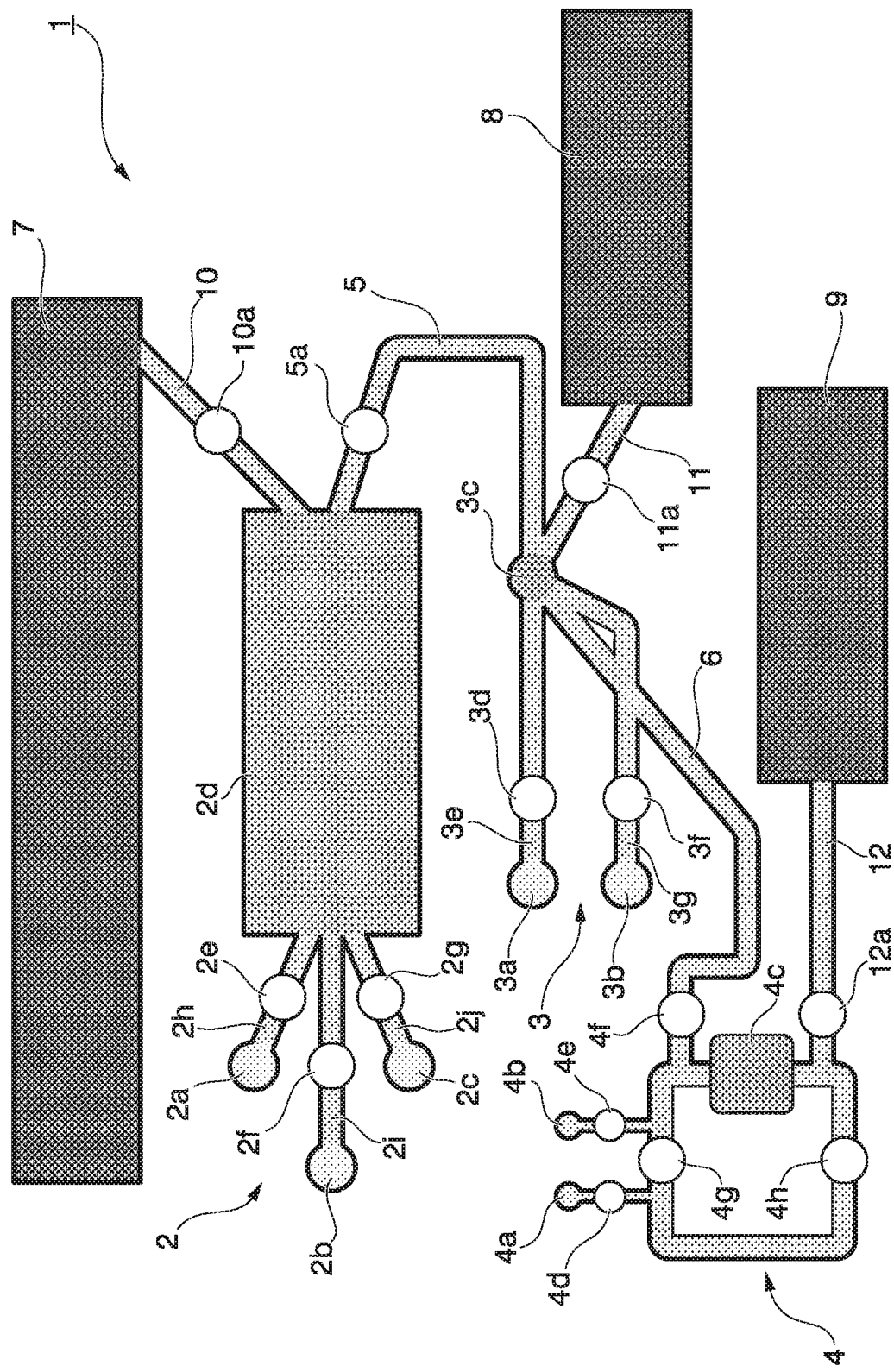
FIG. 11 is a schematic view of an aspect of the fluidic device in the present embodiment.
Figure 12A:
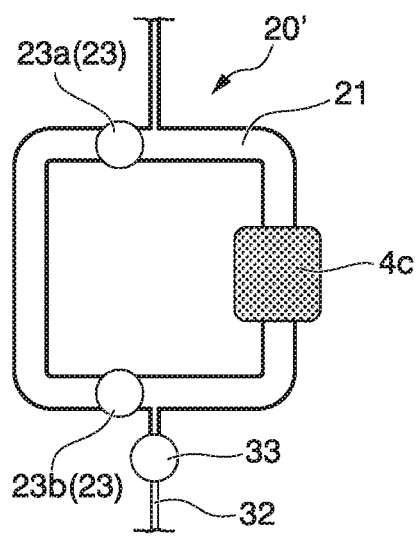
FIG. 12A is a schematic view of an aspect of a solution mixing method in the present embodiment.
Figure 12B:
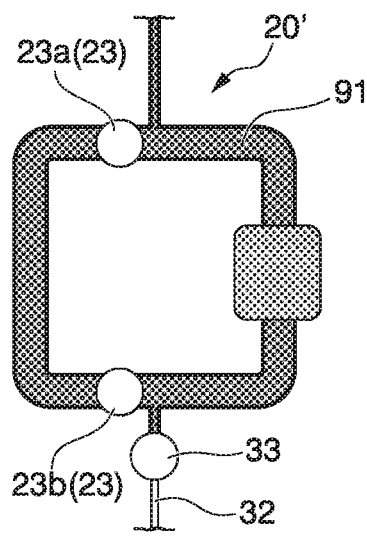
FIG. 12B is a schematic view of an aspect of the solution mixing method in the present embodiment.
Figure 12C:
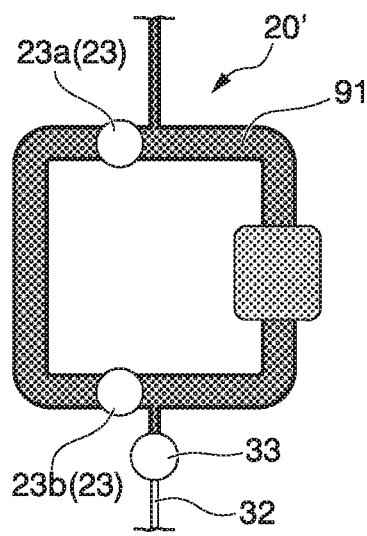
FIG. 12C is a schematic view of an aspect of the solution mixing method in the present embodiment.
Figure 12D:
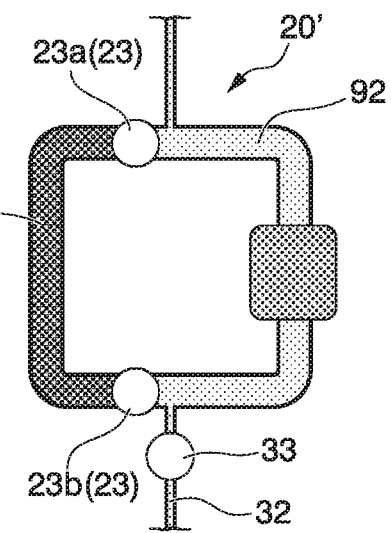
FIG. 12D is a schematic view of an aspect of the solution mixing method in the present embodiment.
Figure 12E:
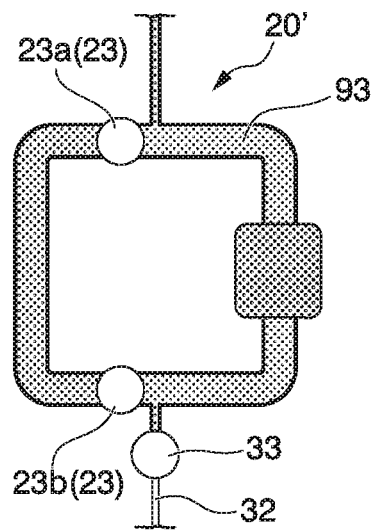
FIG. 12E is a schematic view of an aspect of the solution mixing method in the present embodiment.

An example of each configuration in the fluidic device 1 of the present embodiment will be described using FIG. 11. The exosome purification unit 2 includes an inlet, and an exosome immobilization unit 2d which has the layer modified with the compound having a hydrophobic chain and a hydrophilic chain. It is preferable that the exosome purification unit 2 includes an inlet for each reagent to be introduced, as shown in FIG. 11. That is, it is preferable that the exosome purification unit 2 preferably includes a sample introduction inlet 2b and a lysis buffer introduction inlet 2c, and it is more preferable that the exosome purification unit further includes a washing liquid introduction inlet 2a.

The compound which has a hydrophobic chain and a hydrophilic chain in the exosome immobilization unit 2d is a compound having a hydrophobic chain in order to be bound to a lipid bilayer membrane, and a hydrophilic chain in order to make dissolve this lipid chain soluble. By using the compound, it is possible to immobilize an exosome having a lipid bilayer membrane on the exosome immobilization unit 2d.

In the present specification, the expression "immobilization of an exosome on the exosome immobilization unit 2d" means adsorption of an exosome onto the exosome immobilization unit.

The hydrophobic chain may be a single chain or a multiple chain, and examples thereof include a saturated or unsaturated hydrocarbon group which may have a substituent group.

As the saturated or unsaturated hydrocarbon group, a C6-C24 straight-chain or branched-chain alkyl group or alkenyl group is preferable, and examples thereof include a hexyl group, a heptyl group, an octyl group, a nonyl group, a decyl group, an undecyl group, a dodecyl, a tridecyl group, a tetradecyl group, a pentadecyl group, a hexadecyl group, a heptadecyl group, a stearyl group (octadecyl group), a nonadecyl group, an icosyl group, a heneicosyl group, a docosyl group, a tricosyl group, a tetracosyl group, a myristoleyl group, a palmitoleyl group, an oleyl group, a linoyl group, a linoleyl group, a ricinoleyl group, and an isostearyl group.

Among these, a myristoleyl group, a palmitoleyl group, an oleyl group, a linoyl group, and a linoleyl group are preferable, and an oleyl group is more preferable.

Examples of the hydrophilic chain include proteins, oligopeptides, polypeptides, polyacrylamide, polyethylene glycol (PEG), and dextran, and PEG is preferable.

The hydrophilic chain is preferably modified chemically for binding to a substrate, more preferably has an active ester group, and particularly preferably has an N-hydroxysuccinimide group.

That is, as the compound having a hydrophobic chain and a hydrophilic chain, a lipid-PEG derivative is preferable.

The lipid-PEG derivative is called a biocompatible anchor for membrane (BAM). Examples of the BAM include a compound represented by the following Formula (1).

As the amount of the sample used in the analysis is preferably about 1 mL.

The sample is not particularly limited as long as the sample can be obtained from an environment surrounding a cell to be detected and contains an exosome secreted by the cell, and examples thereof include blood, urine, breast milk, bronchoalveolar lavage fluid, amniotic fluid, a malignant effusion, or saliva. Among these, blood or urine from which it is easy to detect an exosome is preferable. Furthermore, in blood, blood plasma is preferable in view of ease of detection of an exosome.

In addition, the sample also includes a cell culture solution which contains an exosome secreted by a culture cell.

Examples of the cell to be detected include a cancer cell, a mast cell, a dendritic cell, a reticulocyte, an epithelial cell, a B cell, and a neuron, which are known to produce an exosome.

The sample may be prepared through ultracentrifugation, ultrafiltration, continuous flow electrophoresis, filtration using a size filter, gel filtration chromatography, or the like. However, in the present embodiment, the affinity between an exosome and a compound having a hydrophobic chain and a hydrophilic chain in the exosome immobilization unit 2*d* is significantly high, and therefore, the sample may be a sample itself which has not been prepared.

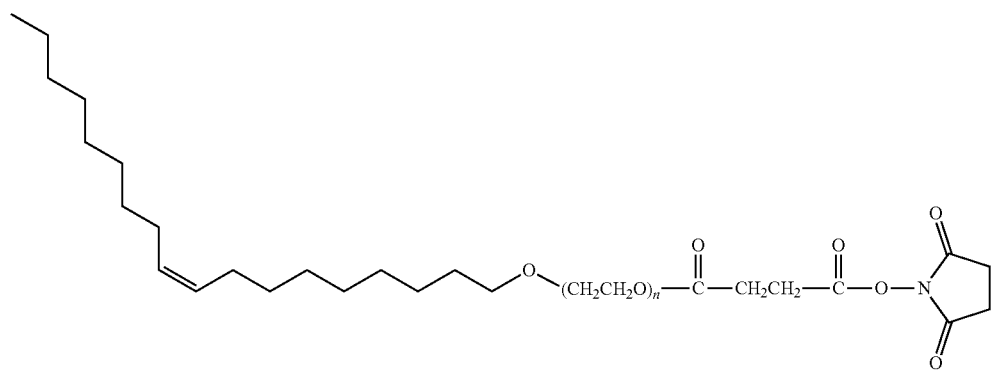

(1)

[In the formula, n represents an integer greater than or equal to 1.]

Examples of the substrate used as a layer of the exosome immobilization unit 2*d* include a glass substrate, a silicon substrate, a polymer substrate, and a metal substrate. The substrate may bind to the compound having a hydrophobic chain and a hydrophilic chain through a substance that binds to the hydrophilic chain of the compound. Examples of the substance include a substance having an amino group, a carboxyl group, a thiol group, a hydroxyl group, or an aldehyde group, and 3-aminopropyltriethoxysilane is preferable.

Driving of a liquid in the fluidic device 1 of the present embodiment is performed by an external suction pump, and the flow of the liquid is controlled by opening and closing a pneumatic valve. The opening and closing of a valve is driven and controlled by an external pneumatic device which is connected to the fluidic device 1.

As shown in FIG. 11, in the analysis of an exosome, a sample is first injected into the sample introduction inlet 2*b* in the above-described exosome purification unit, and the sample is introduced into the exosome immobilization unit 2*d* through suctioning, after opening a valve 2*f* of a flow path 2*i*.

It is preferable to provide a non-specific adsorption suppression unit to the exosome immobilization unit 2*d* from the viewpoint of specifically binding an exosome to the exosome immobilization unit 2*d*. Examples of the method thereof include a method of modifying a substrate with a compound having a hydrophobic chain and a hydrophilic chain, and then, treating a site which is not modified with the compound having a hydrophobic chain and a hydrophilic chain, with a compound having a hydrophilic chain such as PEG.

An exosome in a sample which has been introduced into the exosome immobilization unit 2*d* is captured by the above-described compound having a hydrophobic chain and a hydrophilic chain. The affinity between the exosome and the compound having a hydrophobic chain and a hydrophilic chain is significantly high. Therefore, exosomes in samples are captured on the exosome immobilization unit 2*d* at the same time when the samples continuously pass through the top of the exosome immobilization unit 2*d* without allowing the samples to stand in the exosome immobilization unit 2*d*.

For example, the suction pressure during the capturing of an exosome is 1 kPa to 30 kPa and the time required for the capturing is about 15 seconds. A waste liquid which has been passed through the exosome immobilization unit 2d is sent to the first waste liquid tank 7 after passing through the third flow path 10 via the valve 10a.

In the fluidic device 1 of the present embodiment, it is preferable to design the ceiling height of the exosome immobilization unit 2d to be low. By way of this, the opportunity of contact between an exosome and a compound having a hydrophobic chain and a hydrophilic chain is increased, and therefore, it is possible to improve the capturing efficiency of an exosome.

In blood, extracellular vesicles such as microvesicles or apoptotic bodies are contained in addition to the exosome, and there is a possibility that these extracellular vesicles will be immobilized to the exosome immobilization unit 2d. From the viewpoint of removing these extracellular vesicles from the exosome immobilization unit 2d, it is preferable to wash an exosome on the exosome immobilization unit 2d.

For example, as shown in FIG. 11, a washing liquid is injected into the washing liquid introduction inlet 2a after opening the valve 2e on the flow path 2h, and is introduced into the exosome immobilization unit 2d.

In the present embodiment, the binding of the exosome to the layer modified with the compound having a hydrophilic chain and a hydrophobic chain is strong. Therefore, it is possible to adjust the flow velocity to be fast and to perform washing in a short period of time. For example, washing is performed by sending 500 µL of a PBS washing liquid for about 15 seconds at a suction pressure of 1 kPa to 30 kPa. A waste liquid which has been passed through the exosome immobilization unit 2d is sent to the first waste liquid tank 7 after passing through the third flow path 10 via the valve 10a.

Next, the exosome which has been immobilized on the exosome immobilization unit 2d is lysed. As shown in FIG. 11, a lysis buffer is injected into the lysis buffer introduction inlet 2c and is introduced into the exosome immobilization unit 2d through suctioning, after opening a valve 2g on a flow path 2j. Examples of the lysis buffer include a known liquid in the related art which is used in lysing a cell.

The exosome which has been captured on the exosome immobilization unit 2d is lysed by the lysis buffer passing through the exosome immobilization unit 2d, and a biomolecule contained in the exosome is released.

For example, the suction pressure during the lysing of an exosome is 1 kPa to 30 kPa and the time required for the lysing is about 30 seconds. A waste liquid which has been passed through the exosome immobilization unit 2d is sent to the first waste liquid tank 7 after passing through the third flow path 10 via the valve 10a. The biomolecule which has been released from the exosome is sent to the biomolecule purification unit 3 after passing through the first flow path 5 via a valve 5a.

As shown in FIG. 11, the biomolecule purification unit 3 preferably includes a biomolecule recovery liquid introduction inlet 3b and a biomolecule immobilization unit 3c, and more preferably further includes a biomolecule washing liquid introduction inlet 3a.

The biomolecule immobilization unit 3c is not particularly limited as long as the biomolecule immobilization unit can fix a biomolecule, and examples thereof include a silica membrane which fixes a nucleic acid.

An exosome holds a protein or a nucleic acid which is derived from a cell as a secretion source. Examples of the nucleic acid include miRNA. In recent years, it has been reported that miRNA which is non-code RNA with a short chain suppresses gene expression within a living body, and the relationship between abnormal expression of miRNA and various diseases including cancer is becoming clear.

In the present embodiment, it is preferable that a biomolecule which is immobilized by the biomolecule immobilization unit 3c is miRNA. Examples of the biomolecule immobilization unit 3c include a silica membrane embedded on the flow path, as described above.

A biomolecule is captured on the biomolecule immobilization unit 3c by an exosome lysis buffer passing through the biomolecule immobilization unit 3c.

For example, the suction pressure during the sending an exosome lysis buffer is 50 kPa to 70 kPa and the time required for the sending is about 1 minute. A waste liquid which has been passed through the biomolecule immobilization unit 3c is sent to the second waste liquid tank 8 after passing through the fourth flow path 11 via a valve 11a.

After immobilizing a biomolecule on the biomolecule immobilization unit 3c, it is preferable to remove impurities other than the target biomolecule by washing the biomolecule immobilization unit 3c.

As shown in FIG. 11, a valve 3d on a flow path 3e is opened, a washing liquid is injected into the biomolecule washing liquid introduction inlet 3a, and a washing liquid is introduced into the biomolecule immobilization unit 3c through suctioning. Examples of the washing liquid include ethanol at about 70% to 80%.

For example, the amount of washing liquid to be used during washing is about 1 mL, the suction pressure is 50 kPa to 70 kPa, and the time required for sending a washing liquid is about 1 minute. A waste liquid which has been passed through the biomolecule immobilization unit 3c is sent to the second waste liquid tank 8 after passing through the fourth flow path 11 via the valve 11a. The biomolecule which has been released from the exosome is sent to the biomolecule purification unit 3 after passing through the first flow path 5 via the valve 5a.

In order to prevent the biomolecule washing liquid from being brought into the solution mixer, it is preferable to dry the biomolecule immobilization unit 3c after washing the biomolecule immobilization unit 3c.

As shown in FIG. 11, drying of the biomolecule immobilization unit is performed by suctioning air from the biomolecule washing liquid introduction inlet 3a and passing the air through the biomolecule immobilization unit 3c.

For example, the suction pressure during the drying of the biomolecule immobilization unit 3c is 50 kPa to 70 kPa and the time required for drying is about 2 minutes.

Next, the biomolecule which has been immobilized on the biomolecule immobilization unit 3c is eluted. In order to improve the recovery rate of the biomolecule, it is preferable to hold a biomolecule recovery liquid for a certain time after introducing the biomolecule recovery liquid into the biomolecule immobilization unit 3c.

As shown in FIG. 11, the biomolecule recovery liquid is injected into the biomolecule recovery liquid introduction inlet 3b after opening a valve 3f of a flow path 3g, and is introduced into the biomolecule immobilization unit 3c.

For example, the biomolecule recovery liquid is RNase-free water, the amount of the recovery liquid used is 30 µL the recovery liquid is suctioned at a suction pressure of 50 kPa to 70 kPa, the suctioning is stopped at a point in time at which the recovery liquid has reached the biomolecule immobilization unit 3c, and the recovery liquid is held for about 3 minutes.

Next, the biomolecule is recovered from the biomolecule immobilization unit 3c. For example, the recovery liquid is recovered for 30 seconds at a suction pressure of 50 kPa to 70 kPa.

The biomolecule is sent to the solution mixer 4 through the second flow path 6. For example, the suction pressure of the biomolecule into the solution mixer 4 is less than or equal to 6 kPa, and the biomolecule is sent to the solution mixer for about 30 seconds.

The sending of the biomolecule to the solution mixer 4 is preferably performed after closing valves 4g and 4h in FIG. 11. By doing this, the solution containing the biomolecule is quantitatively determined within the flow path of the solution mixer.

A flow path 6 is connected between the valves 4e and 4g. In addition, the flow path 12 as a solution discharge flow path may be set so as to be connected between the main flow path valve 23b and the main flow path valve 23b' as shown in the fifth to seventh embodiments in "Solution Mixer" which have been described above.

After the biomolecule is sent to the solution mixer 4, a detection probe dissolved liquid is injected into a detection probe introduction inlet 4a after opening a valve 4d, and is sent to the solution mixer 4. Transfer of the detection probe dissolved liquid to the solution mixer 4 is performed after closing the valves 4g and 4h in FIG. 11. By doing this, the detection probe dissolved liquid is quantitatively determined within the flow path of the solution mixer. The position of a flow path for discharge may be set as shown in the fifth to seventh embodiments in <<Solution Mixer>> which have been described above.

For example, the composition of the detection probe dissolved liquid is a 100 nM to 200 nM detection probe, 100 mM to 200 mM Tris-HCl (pH 7.5), 200 mM to 400 mM NaCl, 10 mM to 30 mM $MgCl_2$, 0.5 mg/mL to 2 mg/mL BSA, 10 mM to 30 mM DTT, and 5 units/µL to 20 units/µL T4 DNA Ligase. The detection probe dissolved liquid is sent to the solution mixer for about 30 seconds at a suction pressure of less than or equal to 6 kPa.

Next, the biomolecule and the detection probe dissolved liquid are circulated within the solution mixer after closing valves 4d, 4e, 4f, and 12a and opening the valves 4g and 4h, and are mixed with each other. For example, the opening and closing of a pump valve which is not shown in the drawing is continuously performed for about 10 minutes. A complex (miRNA 133-detection probe 135-capture probe 134 complex) is efficiently formed on a substrate within a short period of time through the circulation of the liquid (refer to FIG. 22). In addition, the pump for circulating a solution is constituted of at least three pump valves including the valves 4g and 4h which are disposed within the flow path of the solution mixer. For example, these three pump valves include one valve 4g and two valves 4h. Alternately, these three pump valves include two valves 4g and one valve 4h. The pump valves include the valve 4g, the valve 4h, and a valve which is not shown in the drawing.

Next, it is preferable to remove a non-specific adsorbed material on the substrate by washing the substrate to which a capture probe is immobilized. Accordingly, it is preferable that the solution mixer 4 further includes a washing liquid introduction inlet 4b as shown in FIG. 11. A washing liquid is injected into the washing liquid introduction inlet 4b after opening the valve 4e, and is introduced into the substrate.

For example, the washing liquid is a 0.2×SSC buffer of which the amount used is 500 µL. The washing is performed by sending the washing liquid to the substrate for 1 minute at a suction pressure of less than or equal to 6 kPa. It is preferable that the washing liquid is circulated within the solution mixer. The washing of the base is efficiently performed within a short period of time through the circulation of the washing liquid. A waste liquid which has been passed through the substrate is sent to the third waste liquid tank 9 after passing through the fifth flow path 12 via the valve 12a.

Next, the intensity of a labeling substance of the complex which has been formed on the substrate is measured. The intensity of a labeling substance reflects the amount of biomolecule existing. Therefore, according to the present embodiment, it is possible to quantitatively determine the amount of biomolecule contained in a sample.

The measurement of the intensity of a labeling substance is performed by, for example, a microscope, a light source, or a control unit such as a personal computer, which is not shown in the drawing.

According to the present embodiment, it is possible to promptly perform analysis of an exosome only within about one hour unlikely in the related art in which it has been taken one day or longer. Furthermore, solutions which are brought into contact with a detection unit are accurately quantitatively determined, and therefore, it is possible to realize accurate analysis.

<<Solution Mixing Method>>

First Embodiment

A solution mixing method of the present embodiment which uses the solution mixer that has been described above includes: a step of sending a first solution from a solution introduction flow path; a step of closing a main flow path valve so as to the first solution being quantitatively delivered by quantitatively compartmentalizing the main flow path; a step of sending a second solution from the solution introduction flow path; a step of closing a solution discharge valve; a step of obtaining a third solution by subjecting the first solution and the second solution to rotary mixing; a step of detecting the third solution; and a step of washing a main flow path by sending a washing liquid to the main flow path after the step of the detecting of the third solution.

The solution mixing method of the present embodiment will be described below while referring to FIG. 12. A mixer 20' shown in FIG. 12 further includes a detection unit 4c, which is included in the solution mixer 70 of the seventh embodiment in <<Solution Mixer>> that has been described above, in the solution mixer 20 of the first embodiment in <<Solution Mixer>> that has been described above. First, a first solution 91 is sent from a solution introduction flow path (refer to FIG. 12B) while the main flow path valves 23 and the discharge flow path valve 33 of the solution mixer 20' are open (refer to FIG. 12A). Next, the main flow path valves 23 are closed so as to quantitatively divide the first solution by quantitatively compartmentalizing the main flow path 21 (refer to FIG. 12C). Then, a second solution 92 is sent from the solution introduction flow path 42 (refer to FIG. 12D). A third solution 93 is obtained by circulatory mixing the first solution 91 with the second solution 92 by closing the solution discharge valve 33 and opening the main flow path valves 23 (refer to FIG. 12E). Next, after discharging the third solution 93 by opening the solution discharge flow path valve 33, a washing liquid is sent to the main flow path 21 from the solution introduction flow path 42 to wash the main flow path. The washing is efficiently achieved by circulatory mixing the washing liquid through the same method as that described above.

Second Embodiment

A solution mixing method of the present embodiment which uses the solution mixer that has been described above includes: a step A of selecting two adjacent flow paths (main flow paths) out of a plurality of flow paths (main flow paths) included in the main flow path; a step B of closing valves which are adjacent to the flow paths (main flow paths) such that the two flow paths (main flow paths) and the connecting flow path which is adjacent to the two flow paths (main flow paths) are quantitatively compartmentalized; a step C of sending the first solution to the first flow path (main flow path) out of the two flow paths (main flow paths); a step D of sending the second solution to the second flow path (main flow path) out of the two flow paths (main flow paths); and a step E of obtaining a third solution by circulatory mixing the first solution with the second solution after opening the main flow path valves for opening and closing the connecting flow path which allows communication between the two flow paths (main flow paths). The solution mixing method thereof further includes: a step F of selecting a third flow path (main flow path) which is adjacent to the two flow paths (main flow paths) after the step E; a step G of closing valves which are adjacent to the third flow path (main flow path) such that the third flow path (main flow path) and the connecting flow path which is adjacent to the third flow path (main flow path) are quantitatively compartmentalized; a step H of sending a fourth solution to the third flow path (main flow path); and a step I of obtaining a fifth solution by circulatory mixing the third solution with the fourth solution after opening the main flow path valves for opening and closing the connecting flow path which allows communication between the three flow paths (main flow paths).

The solution mixing method of the present embodiment will be described below while referring to FIGS. 13 to 16. FIGS. 13 to 16 are modification examples of the solution mixer 30' which is shown in the third embodiment and the solution mixer 50 which is shown in the fifth embodiment in the above-described solution mixers. The number of flow paths which communicates with each other using the connecting flow path included in the solution mixer is two. However, the solution mixer 50' in FIGS. 13 to 16 includes four parallel flow paths 21a, 21b, 21c, and 21d as main flow paths. Each of the flow paths includes each solution introduction flow path 42, solution introduction flow path valves 43a, 43b, 43c, and 43d, each solution discharge flow path 32, and solution discharge flow path valves 33a, 33b, 33c, and 33d. In addition, the solution mixer 50' includes each connecting flow path 22 which allows communication between the flow paths, and main flow path valves 23a, 23b, 23c, 23d, 23e, and 23f which are arranged on the connecting flow path 22.

Figure 13A:
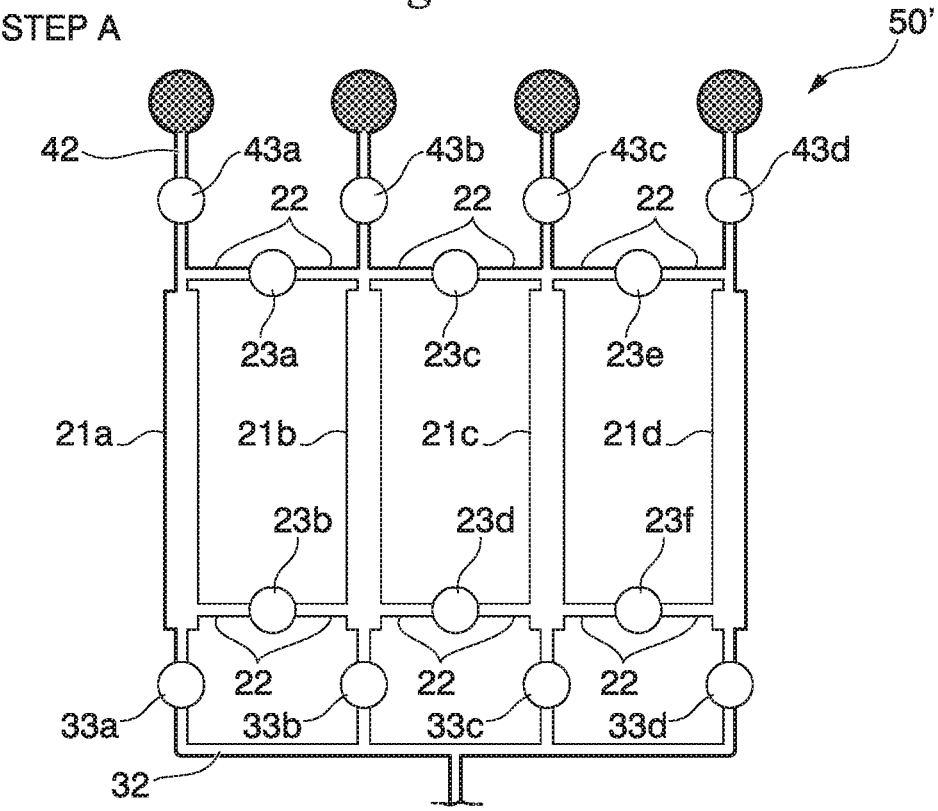
FIG. 13A is a schematic view of an aspect of a solution mixing method (step A) in the present embodiment.
Figure 13B:
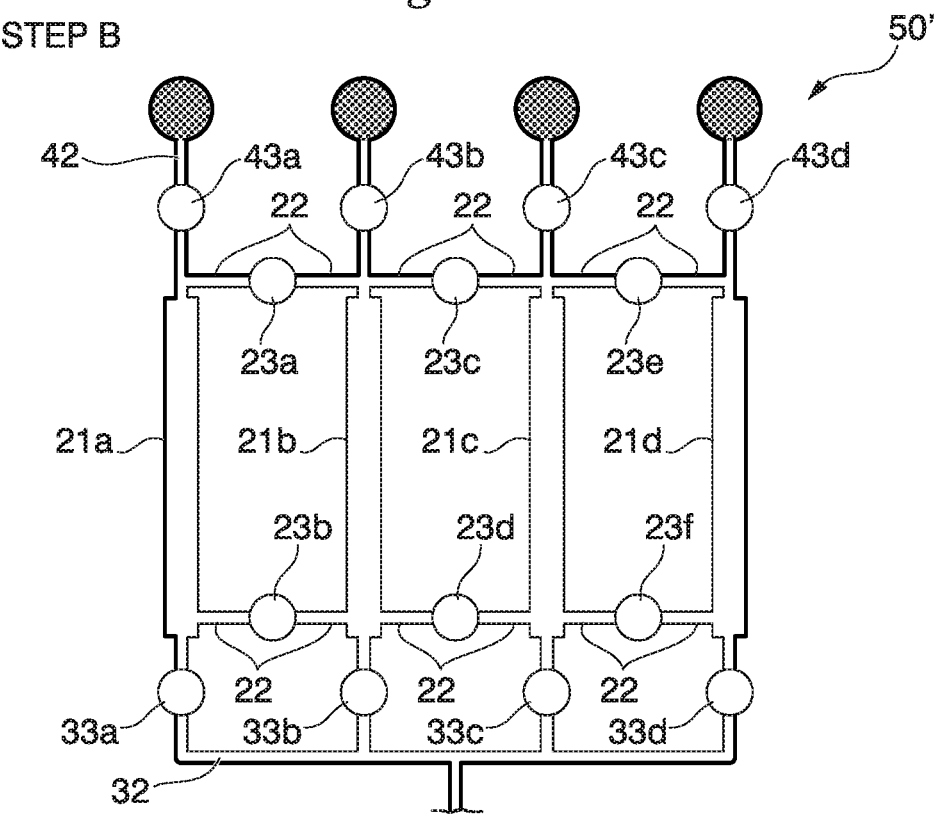
FIG. 13B is a schematic view of an aspect of a solution mixing method (step B) in the present embodiment.
Figure 14A:
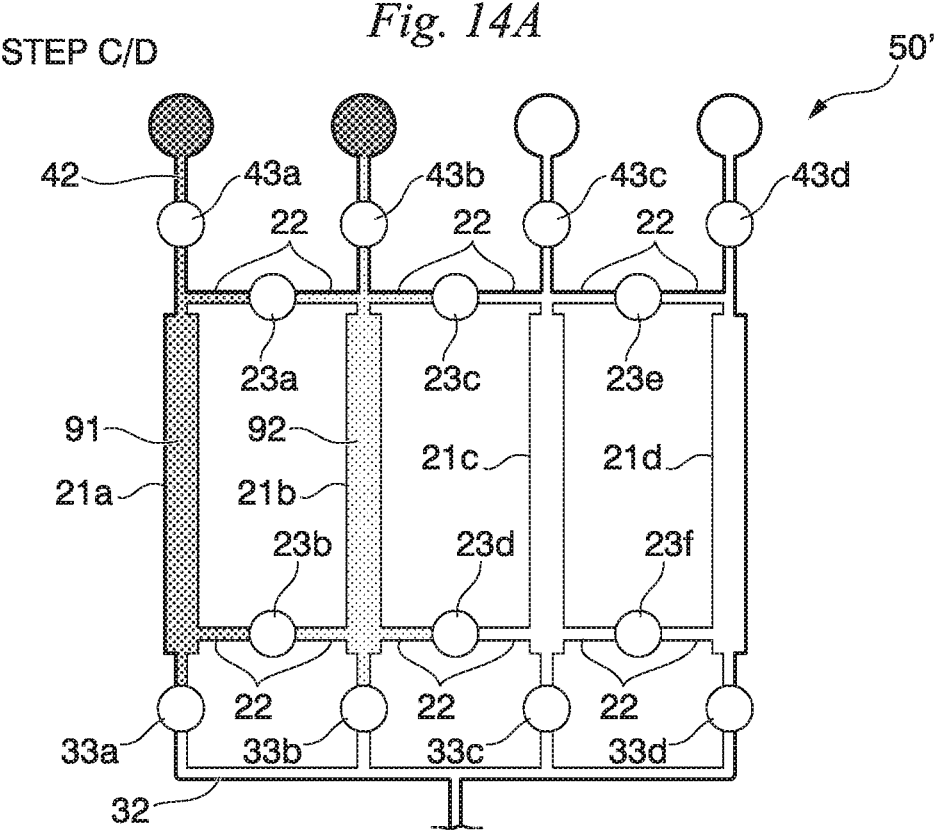
FIG. 14A is a schematic view of an aspect of a solution mixing method (steps C and D) in the present embodiment.
Figure 14B:
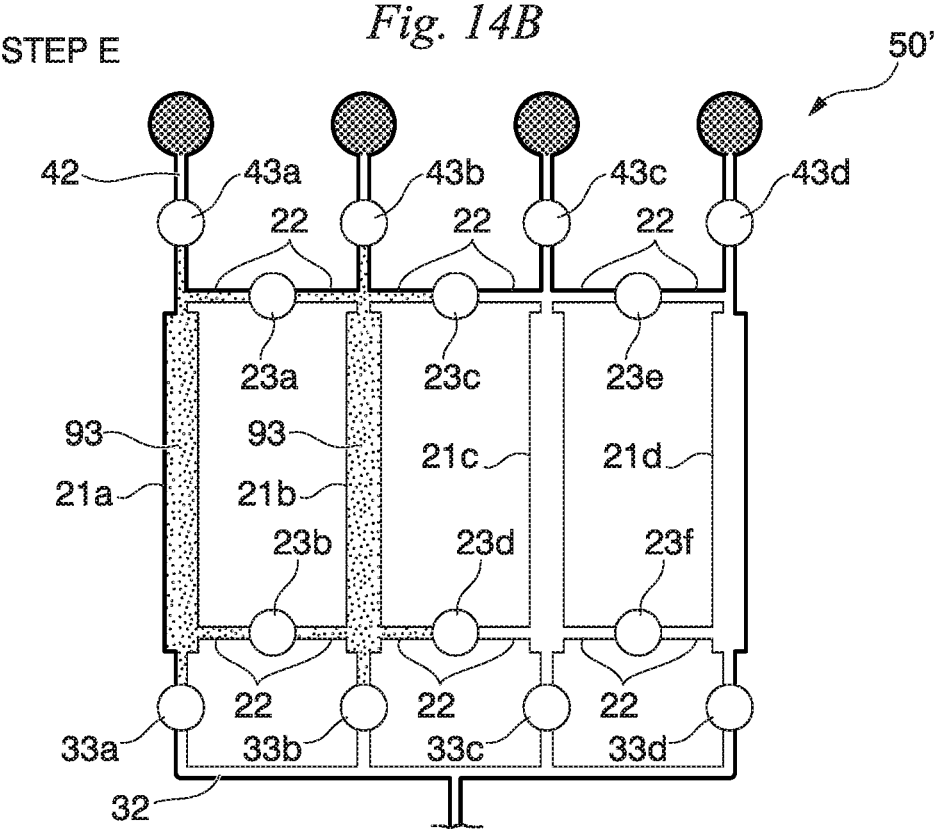
FIG. 14B is a schematic view of an aspect of a solution mixing method (step E) in the present embodiment.
Figure 16A:
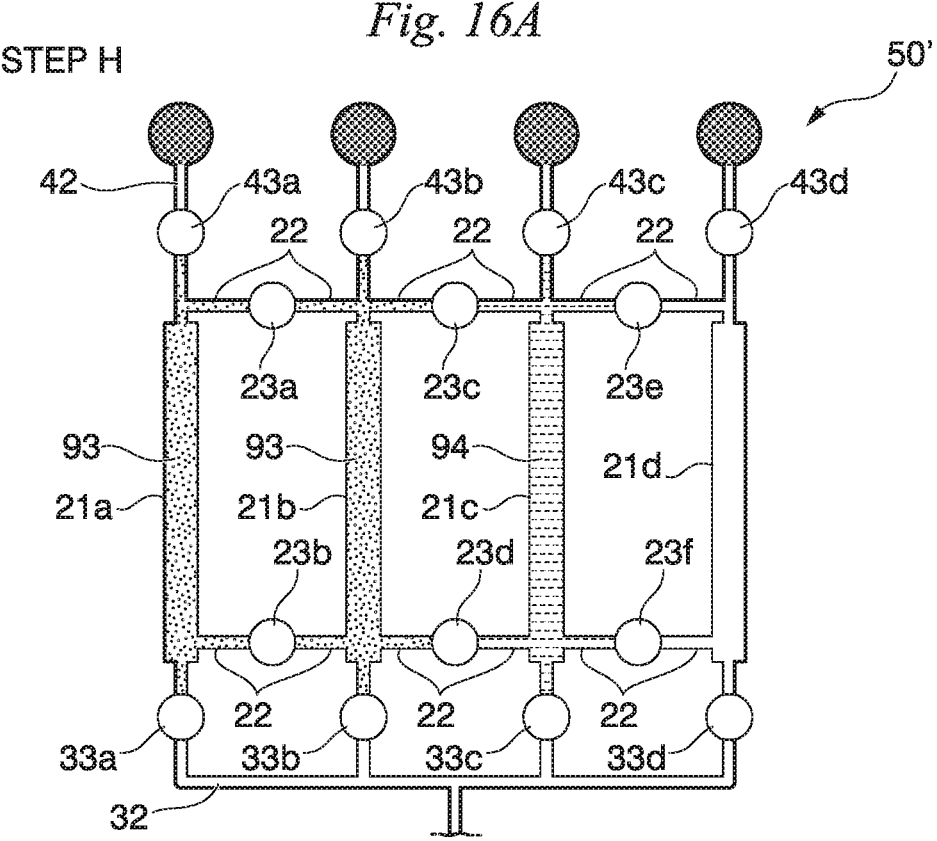
FIG. 16A is a schematic view of an aspect of a solution mixing method (step H) in the present embodiment.
Figure 16B:
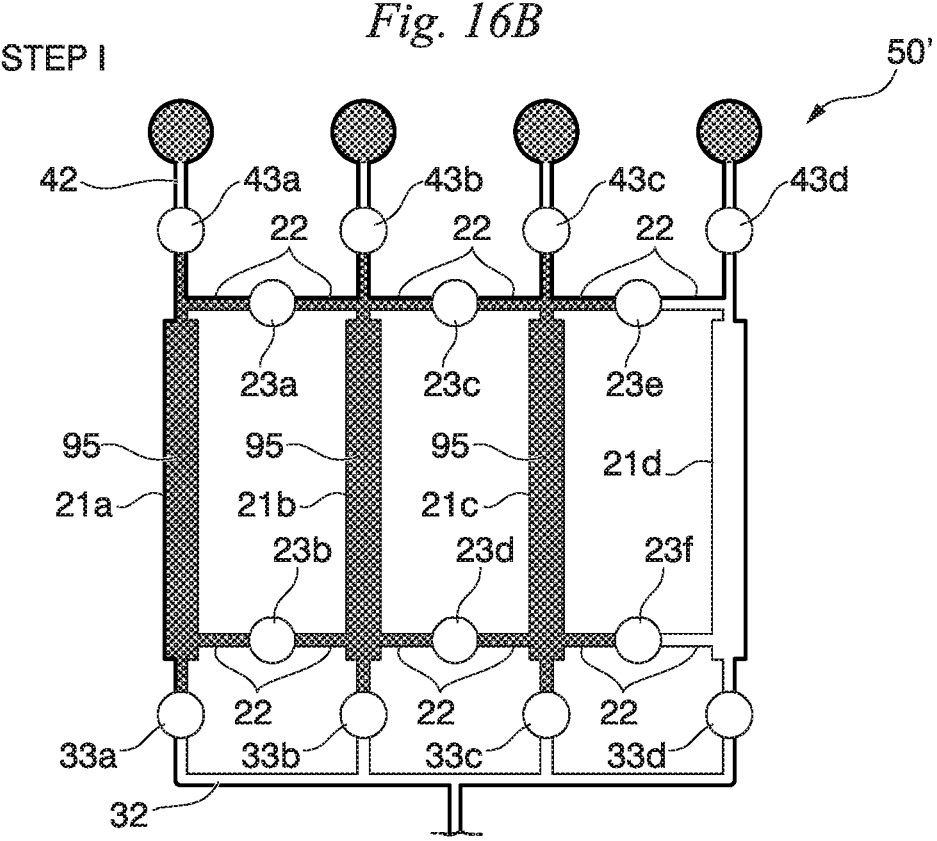
FIG. 16B is a schematic view of an aspect of a solution mixing method (step I) in the present embodiment.

The solution mixing method using the solution mixer 50' will be described below. FIGS. 13A and 13B may be referred to for the steps A and B, FIGS. 14A and 14B may be referred to for the steps C to E, FIGS. 15A and 15B may be referred to for the steps F and G, and FIGS. 16A and 16B may be referred to for the steps H and I.

(Step A): First, two adjacent flow paths (main flow paths) 21a and 21b out of main flow paths 21 are selected.

(Step B): Main flow path valves 23a, 23b, 23c, and 23d and solution discharge flow path valves 33a and 33b which are adjacent to the flow paths (main flow paths) are closed such that the two flow paths (main flow paths) 21a and 21b and the connecting flow path 22 which is adjacent to the two flow paths (main flow paths) are quantitatively compartmentalized.

(Steps C and D): A first solution 91 and a second solution 92 are respectively sent to the first flow path (main flow path) 21a and the second flow path (main flow path) 21b.

(Step E): A third solution 93 is obtained by circulatory mixing the first solution 91 with the second solution 92 after opening the main flow path valves 23a and 23b for opening and closing the connecting flow path which allows communication between the flow path (main flow path) 21a and the flow path (main flow path) 21b.

(Step F): A third flow path (main flow path) 21c which is adjacent to the two flow paths (main flow paths) 21a and 21b is selected.

(Step G): Main flow path valves 23e and 23f and a solution discharge flow path valve 33c which are adjacent to the flow path (main flow path) 21c are closed such that the flow path (main flow path) 21c and the connecting flow path which is adjacent to the flow path (main flow path) 21c are quantitatively compartmentalized.

(Step H): A fourth solution 94 is sent to the flow path (main flow path) 21c.

(Step I): A fifth solution 95 is obtained by circulatory mixing the third solution with the fourth solution after opening the main flow path valves 23a, 23b, 23c, and 23d for opening and closing the connecting flow path which allows communication between these three flow paths (main flow paths) 21a, 21b, and 21c.

As shown in the present embodiment, it is possible to circulate mix desired solutions by sequentially selecting a plurality of parallel flow paths included in the solution mixer 50'. In addition, the rotary mixing may be performed by similarly repeating the step F to the step I.

Hereinafter, the present invention will be described using Example, but is not limited to the following Example.

Example

[Purification of Exosome]

A glass surface was modified with 3-aminopropyltriethoxysilane (hereinafter, also referred to as APTES) and a terminal of APTES was then modified with a PEG-lipid derivative, which captured an exosome to the terminal of APTES and was represented by the Formula (1), and methoxy PEG which suppresses non-specific adsorption. Next, a purification device was produced by subjecting polymethacrylstyrene to cutting processing. An exosome suspension, which was recovered through ultracentrifugation of a culture supernatant of a breast cancer cell strain MCF-7, and exosomes in human serum were immobilized to the inside of the device. Then, the density of the immobilized particles was measured by AFM.

Figure 17:
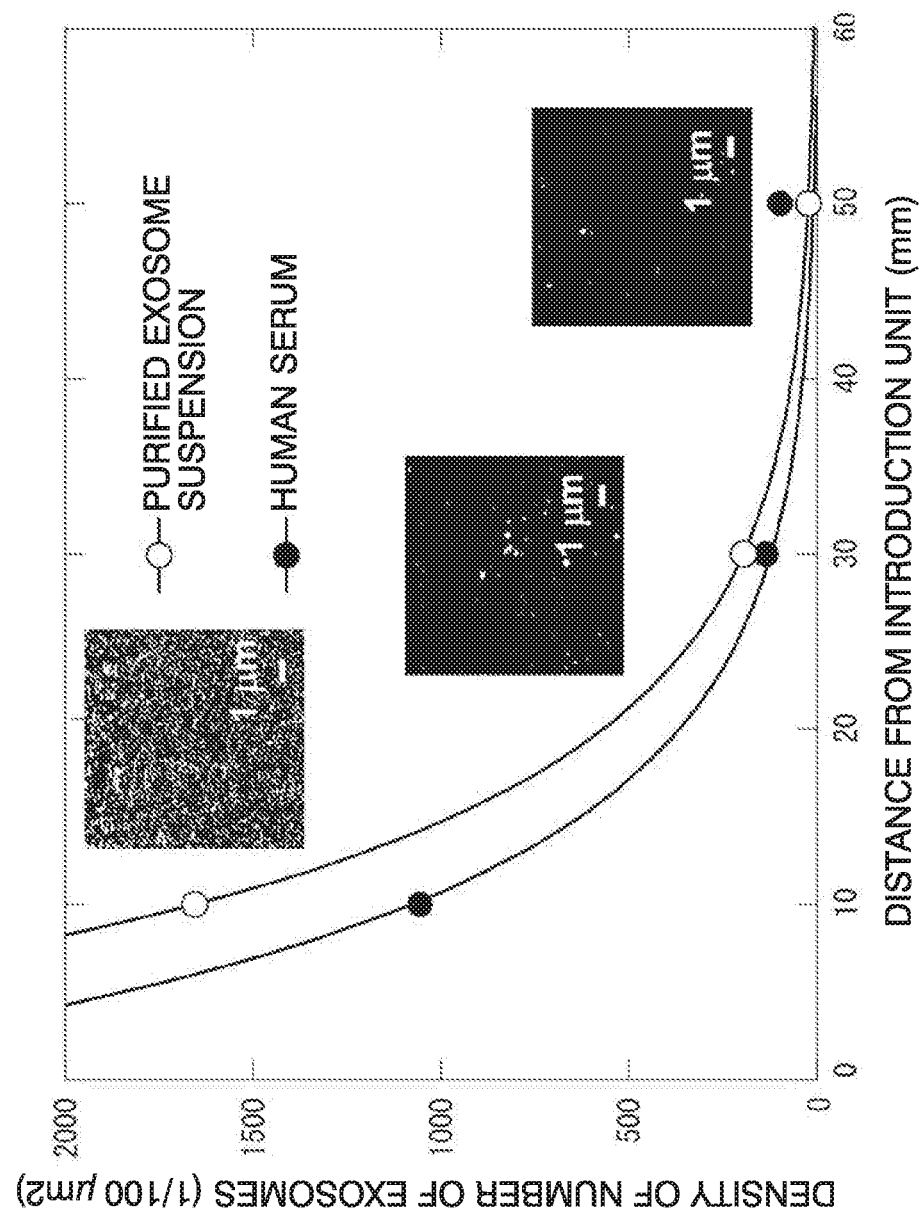
FIG. 17 is a result of quantitative determination of an exosome which is immobilized to a BAM substrate in Example.

AFM images and the immobilization density of exosomes which have been immobilized to the inside of the device are shown in FIG. 17. First, it was confirmed that particles having diameters of 30 nm to 200 nm were immobilized thereto, from the AFM images.

Next, it was confirmed that the immobilization density was exponentially decreased with respect to the distance from the immobilization layer. In addition, the immobilized amount in a case where exosomes were directly immobilized from human serum was 74% of cases where purified exosomes were immobilized. Therefore, it was considered that the methoxy PEG contributed to the suppression of the non-specific adsorption.

[Purification of miRNA]

A device in which a miniaturized silica membrane was immobilized to the inside of a flow path was produced to perform purification of miRNA. miRNA was suspended in an exosome lysis buffer which was then passed through the silica membrane through a suction operation. Subsequently, washing and drying of the silica membrane were performed, and then, miRNA was recovered by introducing a miRNA elution liquid. The amount of miRNA recovered was obtained through quantitative real-time PCR.

In addition, miRNeasy Mini Kit of QIAGEN was used for the comparison with a general spin column method.

Figure 18:
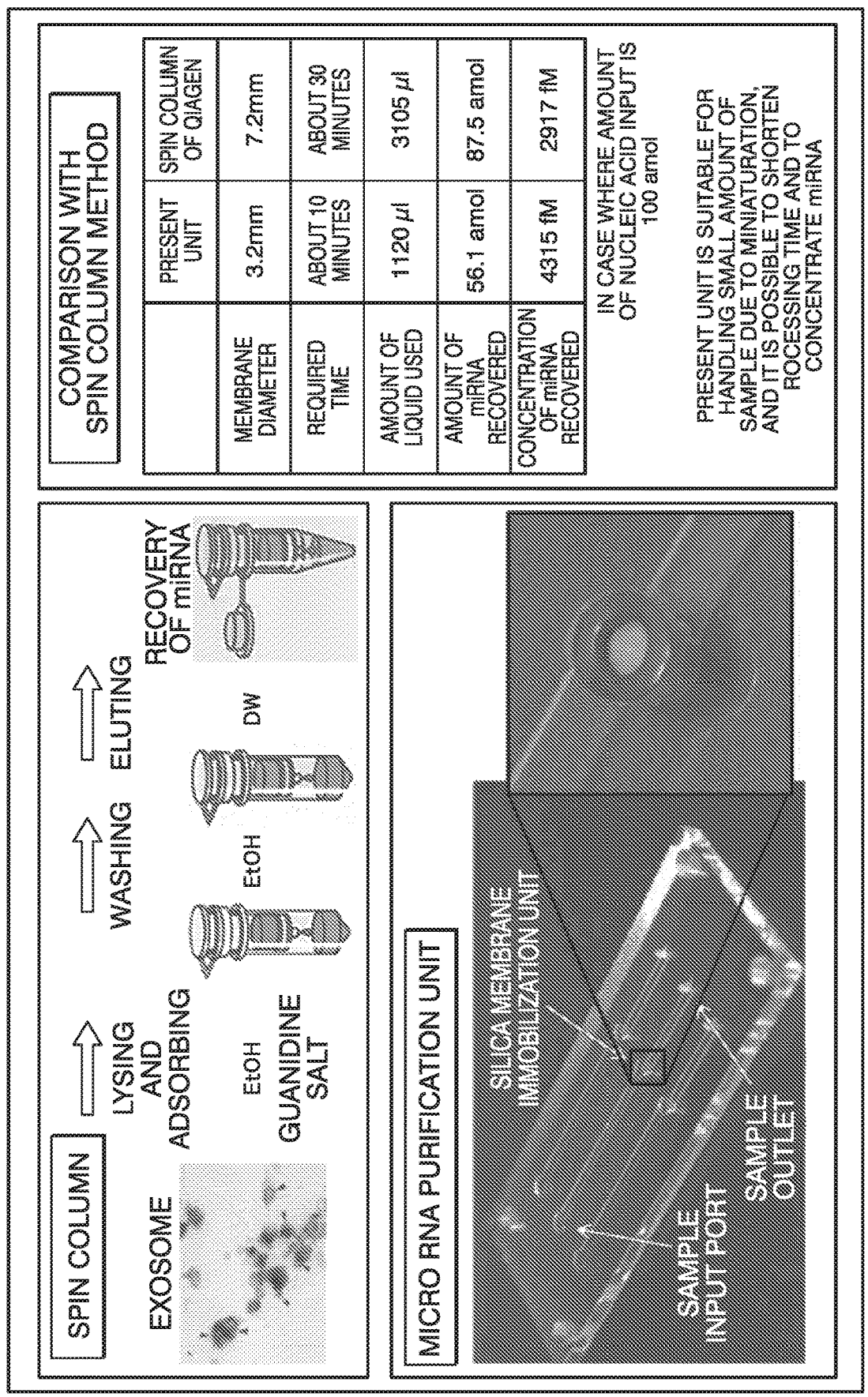
FIG. 18 is a result of quantitative determination of miRNA purified in Example.

The recovery results of miRNA are shown in FIG. 18. In the present unit, shortening of required time and reduction of the amount of reagent used were achieved by reducing the size of the silica membrane. In addition, it became possible to recover miRNA using a small amount of elution liquid in accordance with the reduction in the size, and therefore, it became possible to concentrate the miRNA solution.

[Detection of miRNA]

RNA having a sequence of miR-141, miR-143, miR-1275, miR-107, miR-181a-2*, miR-484, miR-21, let-7a, let-7b, let-7d, let-7f, and miR-39 as target miRNAs was synthesized. In addition, in total 12 kinds of nucleic acid probes of detection probes having a sequence which is complementary to each target miRNA were designed and synthesized. In contrast, capture probes having a sequence complementary to each target miRNA were synthesized on a glass substrate, and were arranged in a spot shape.

Used sequences of the target miRNA, the capture probes, and the detection probes are shown below.

```
(1) Target miRNA 1: miR-141
                            (SEQ ID No: 1: 22-mer)
[Sequence: 5'-UAACACUGUCUGGUAAAGAUGG-3']

Target miRNA 2: miR-143
                            (SEQ ID No: 2: 21-mer)
[Sequence: 5'-UGAGAUGAAGCACUGUAGCUC-3']

Target miRNA 3: miR-1275
                            (SEQ ID No: 3: 17-mer)
[Sequence: 5'-GUGGGGGAGAGGCUGUC-3']

Target miRNA 4: miR-107
                            (SEQ ID No: 4: 23-mer)
[Sequence: 5'-AGCAGCAUUGUACAGGGCUAUCA-3']

Target miRNA 5: miR-181a-2*
                            (SEQ ID No: 5: 22-mer)
[Sequence: 5'-ACCACUGACCGUUGACUGUACC-3']

Target miRNA 6: miR-484
                            (SEQ ID No: 6: 22-mer)
[Sequence: 5'-UCAGGCUCAGUCCCCUCCCGAU-3']

Target miRNA 7: miR-21
                            (SEQ ID No: 7: 22-mer)
[Sequence: 5'-UAGCUUAUCAGACUGAUGUUGA-3']

Target miRNA 8: let-7a
                            (SEQ ID No: 8: 22-mer)
[Sequence: 5'-UGAGGUAGUAGGUUGUAUAGUU-3']

Target miRNA 9: let-7b
                            (SEQ ID No: 9: 22-mer)
[Sequence: 5'-UGAGGUAGUAGGUUGUGUGGUU-3']

Target miRNA 10: let-7d
                            (SEQ ID No: 10: 22-mer)
[Sequence: 5'-AGAGGUAGUAGGUUGCAUAGUU-3'

Target miRNA 11: let-7f
                            (SEQ ID No: 11: 22-mer)
[Sequence: 5'-UGAGGUAGUAGAUUGUAUAGUU-3']

Target miRNA 12: miR-39
                            (SEQ ID No: 12: 22-mer)
[Sequence: 5'-UCACCGGGUGUAAAUCAGCUUG-3']
```

(2) Capture Probe 1

[Sequence: 5'-p-X1-fS-3']

X1 represents the following sequence, p represents a phosphoric acid, S represents a thiol group, and f represents 6-FAM (6-fluoroscein).

X1:

```
                            (SEQ ID No: 13: 60-mer)
ACCAGACAGTGTTAACAACAACAACAACAACAACAACAACAACAACAAC

AACAACAACAA
```

Capture Probe 2
X1:

```
                            (SEQ ID No: 14: 60-mer)
GTGCTTCATCTCAACAACAACAACAACAACAACAACAACAACAACAACA

ACAACAACAAC
```

Capture Probe 3
X1:

```
                            (SEQ ID No: 15: 60-mer)
CTCCCCCACACAACAACAACAACAACAACAACAACAACAACAACAACAA

CAACAACAACA
```

Capture Probe 4
X1:

```
                            (SEQ ID No: 16: 60-mer)
CTGTACAATGCTGCTACAACAACAACAACAACAACAACAACAACAACAAC

AACAACAACA
```

Capture Probe 5
X1:

```
                            (SEQ ID No: 17: 60-mer)
CAACGGTCAGTGGTACAACAACAACAACAACAACAACAACAACAACAAC

AACAACAACAA
```

Capture Probe 6
X1:

```
                            (SEQ ID No: 18: 60-mer)
GGGACTGAGCCTGAACAACAACAACAACAACAACAACAACAACAACAAC

AACAACAACAA
```

Capture Probe 7
X1:

```
                            (SEQ ID No: 19: 60-mer)
AGTCTGATAAGCTAACAACAACAACAACAACAACAACAACAACAACAAC

AACAACAACAA
```

Capture Probe 8
X1:

```
                            (SEQ ID No: 20: 60-mer)
AACCTACTACCTCAACAACAACAACAACAACAACAACAACAACAACAAC

AACAACAACAA
```

Capture Probe 9

X1:
(SEQ ID No: 21: 60-mer)
ACCTACTACCTCAACAACAACAACAACAACAACAACAACAACA
ACAACAACAAC Capture Probe 10

X1:
(SEQ ID No: 22: 60-mer)
AACCTACTACCTCTACAACAACAACAACAACAACAACAACAAC
AACAACAACAA Capture Probe 11

X1:
(SEQ ID No: 23: 60-mer)
ATCTACTACCTCAACAACAACAACAACAACAACAACAACAACAA
CAACAACAAC Capture Probe 12

X1:
(SEQ ID No: 24: 60-mer)
TTTACACCCGGTGAACAACAACAACAACAACAACAACAACAACA
ACAACAACAA (3) Detection Probe 1
[Sequence: 5'-p-X2-Al-X3-3']
X2 and X3 represents the following sequences, p represents a phosphoric acid, and Al represents Alexa647-AminoC6-dA.

X2: (SEQ ID No: 25: 17-mer) CTCAACTGGTGTCGTGG
X3: (SEQ ID No: 26: 26-mer) GTCGGCAATTCAGTTGAGCCATCTTT Detection Probe 2

X2: (SEQ ID No: 25: 17-mer) CTCAACTGGTGTCGTGG
X3: (SEQ ID NO: 27: 26-mer) GTCGGCAATTCAGTTGAGGAGCTACA Detection Probe 3

X2: (SEQ ID No: 25: 17-mer) CTCAACTGGTGTCGTGG
X3: (SEQ ID NO: 28: 26-mer) GTCGGCAATTCAGTTGAGGACAGCCT Detection Probe 4

X2: (SEQ ID No: 25: 17-mer) CTCAACTGGTGTCGTGG
X3: (SEQ ID NO: 29: 26-mer) GTCGGCAATTCAGTTGAGTGATAGCC Detection Probe 5

X2: (SEQ ID No: 25: 17-mer) CTCAACTGGTGTCGTGG
X3: (SEQ ID NO: 30: 26-mer) GTCGGCAATTCAGTTGAGGGTACAGT Detection Probe 6

X2: (SEQ ID No: 25: 17-mer) CTCAACTGGTGTCGTGG
X3: (SEQ ID NO: 31: 26-mer) GTCGGCAATTCAGTTGAGATCGGGAG Detection Probe 7

X2: (SEQ ID No: 25: 17-mer) CTCAACTGGTGTCGTGG
X3: (SEQ ID NO: 32: 26-mer) GTCGGCAATTCAGTTGAGTCAACATC Detection Probe 8

X2: (SEQ ID No: 25: 17-mer) CTCAACTGGTGTCGTGG
X3: (SEQ ID NO: 33: 26-mer) GTCGGCAATTCAGTTGAGAACTATAC Detection Probe 9

X2: (SEQ ID No: 25: 17-mer) CTCAACTGGTGTCGTGG
X3: (SEQ ID NO: 34: 27-mer) GTCGGCAATTCAGTTGAGAACCACACA Detection Probe 10

X2: (SEQ ID No: 25: 17-mer) CTCAACTGGTGTCGTGG
X3: (SEQ ID NO: 35: 26-mer) GTCGGCAATTCAGTTGAGAACTATGC Detection Probe 11

X2: (SEQ ID No: 25: 17-mer) CTCAACTGGTGTCGTGG
X3: (SEQ ID NO: 36: 27-mer) GTCGGCAATTCAGTTGAGAACTATACA Detection Probe 12

X2: (SEQ ID No: 25: 17-mer) CTCAACTGGTGTCGTGG
X3: (SEQ ID NO: 37: 26-mer) GTCGGCAATTCAGTTGAGCAAGCTGA A DNA micro array substrate to which one of the above-described capture probes was immobilized was purchased from Agilent Technologies, and was allowed to stand for 90 minutes at room temperature while being brought into contact with a solution in Table 1. After washing the DNA micro array substrate with ultrapure water and drying the DNA micro array substrate, the DNA micro array substrate was installed in a solution mixer.

In Table 1, the composition of Takara 10× buffer is 500 mM Tris-HCl (pH 7.5), 100 mM MgCl2, and 50 mM DTT.

TABLE 1

| 10 unit/μl T4 Polynucleotide Kinase | 25 μl |
|---|---|
| 5M betaine 100 mM ATP | 10 μl |
| Takara 10 × buffer | 100 μl |
| Milli-Q Water | 865 μl |
| Total | 1000 μl |

Furthermore, a miRNA solution with an arbitrary concentration was adjusted as in Table 2, and a hybridization reaction solution containing a detection probe was prepared as in Table 3.

TABLE 2

| 1 μM miR-141 | 1 μl |
|---|---|
| 1 μM miR-143 | 1 μl |
| 1 μM miR-1275 | 1 μl |
| 1 μM miR-107 | 1 μl |
| 1 μM mi-181a-2* | 1 μl |
| 1 μM miR-484 | 1 μl |
| 1 μM miR-21 | 1 μl |
| 1 μM let-7a | 1 μl |
| 1 μM let-7b | 1 μl |
| 1 μM let-7d | 1 μl |
| 1 μM let-7f | 1 μl |
| 10 μM miR-39 | 1 μl |
| RNase-free water | 88 μl |
| Total | 100 μl |

TABLE 3

| 20 μM Detect probe1 | 1 μl |
|---|---|
| 20 μM Detect probe2 | 1 μl |
| 20 μM Detect probe3 | 1 μl |
| 20 μM Detect probe4 | 1 μl |
| 20 μM Detect probe5 | 1 μl |
| 20 μM Detect probe6 | 1 μl |
| 20 μM Detect probe7 | 1 μl |
| 20 μM Detect probe8 | 1 μl |
| 20 μM Detect probe9 | 1 μl |
| 20 μM Detect probe10 | 1 μl |
| 20 μM Detect probe11 | 1 μl |
| 20 μM Detect probe12 | 1 μl |
| 1M Tris-HCl (pH 7.5) | 13.3 μl |
| 1M MgCl$_2$ | 2 μl |
| 100 mM ATP | 2 μl |
| 10 mg/ml BSA | 2 μl |
| 1M DTT | 2 μl |
| 2.5M NaCl | 12 μl |
| 350 units/μl T4 DNA ligase | 2.9 μl |
| RNase-free water | 51.8 μl |
| Total | 100 μl |

The prepared miRNA solution was introduced from an inlet 1 of a solution mixer and the hybridization reaction solution was introduced from an inlet 2, and the solutions were hybridized by being circulated for 10 minutes.

After the completion of the hybridization reaction, the DNA micro array substrate was washed by sending 500 μl of a washing liquid, which contains 0.3 M NaCl and 30 mM sodium citrate, from the inlet 3, and the fluorescence intensity was measured after observing the substrate using a fluorescence microscope.

Figure 19:
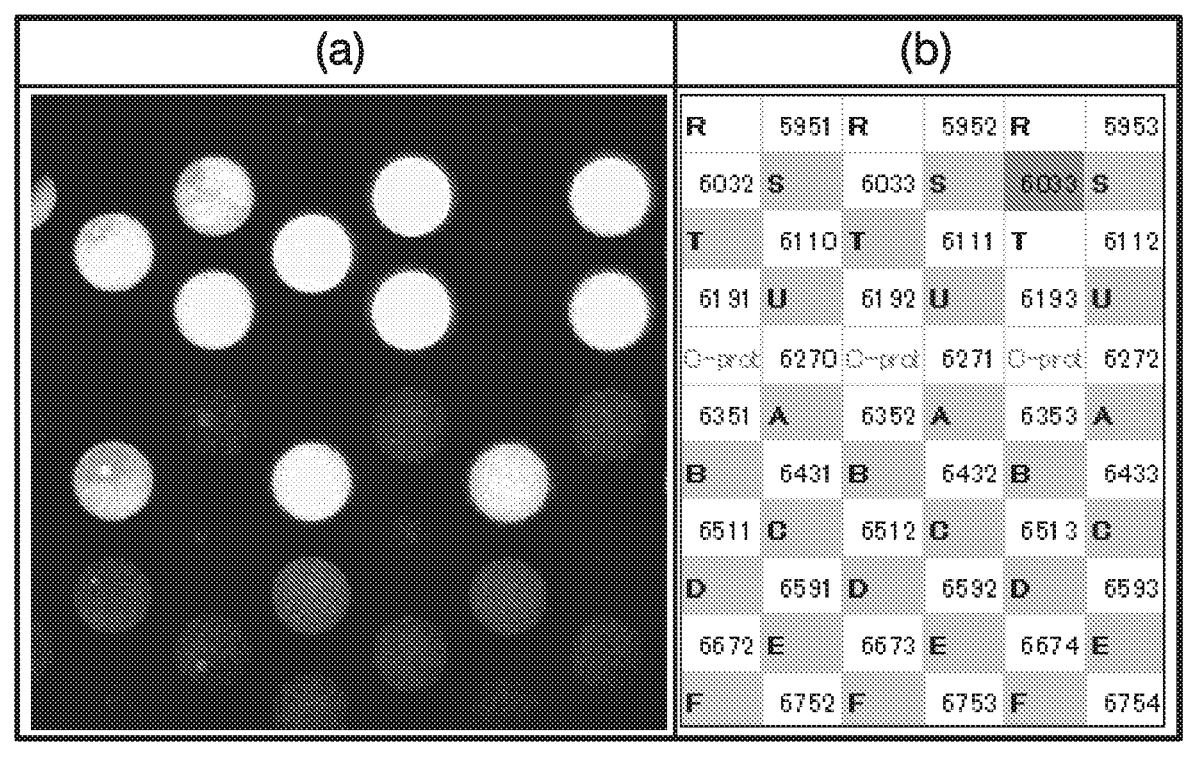

The results are shown in FIG. 19. FIG. 19(a) is an image of the substrate showing miRNA analysis results.

FIG. 19(b) corresponds to FIG. 19(a), and a spot shown by half-tone dot meshing is a spot which corresponds to target miRNA and in which fluorescence is to be observed. Each letter corresponds to the following miRNA.

A: 141, B: 143, C: 1275, D: 107, E: 181a-2*, F: 484, S: let-7a, T: let-7b, U: let-7d In each of the spots to which probes corresponding to the introduced miRNA were immobilized, fluorescence images of the detection probes which had been labeled with Alexa 647 were observed. miR-1275 of "C" was put at a concentration of one thousandth of the other miRNAs in order to check the detection limit concentration, and therefore, the fluorescence becomes dark. In addition, the difference in brightness for each of the sequences of the probes is caused by the difference in affinity of probes.

For this reason, it was confirmed that it was possible to sequence-dependently detect miRNA using the solution mixer.

[Quantitative Determination of Solution and Rotary Mixing]

Figure 20:
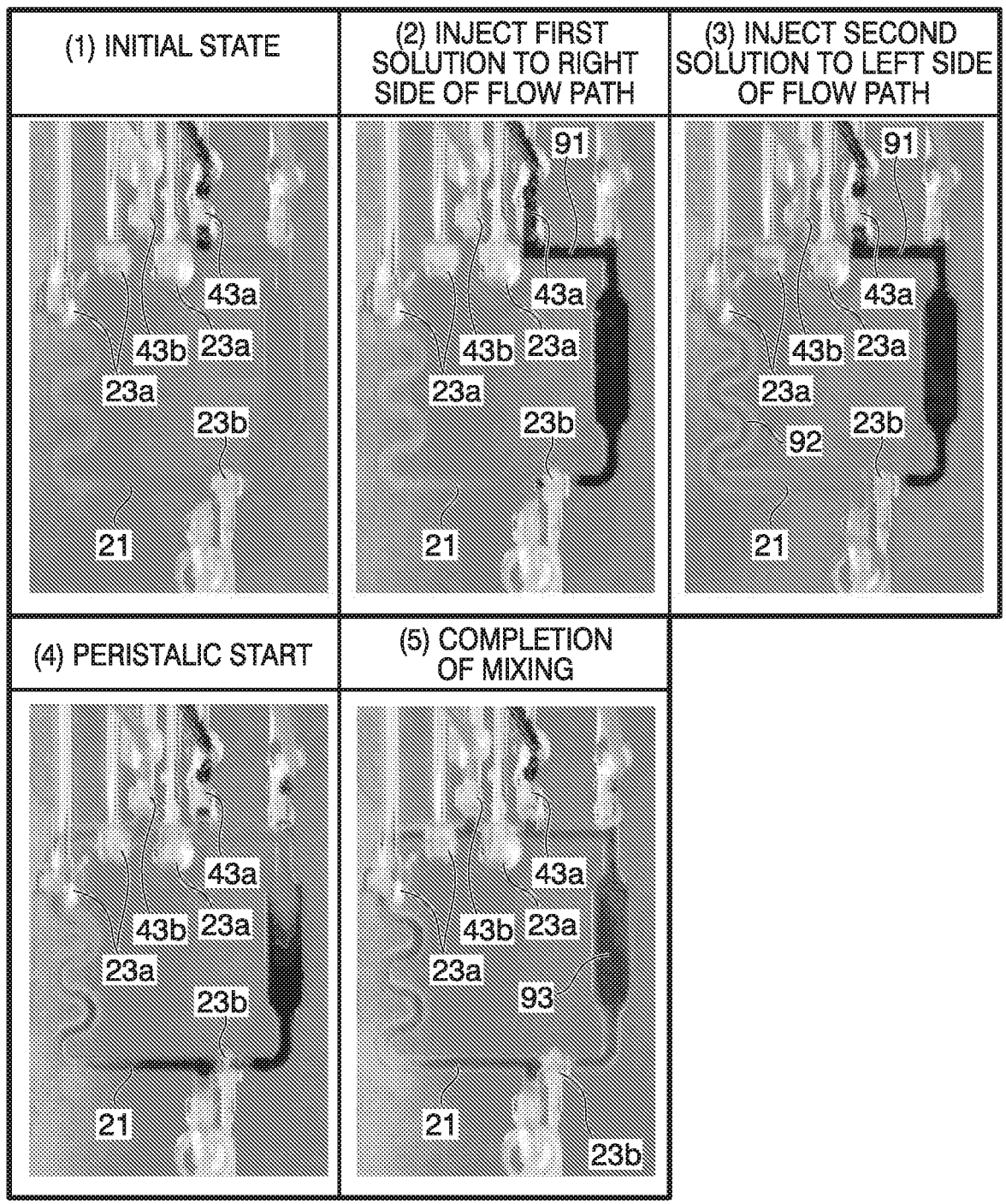
FIG. 20 is an image showing a result of mixing solutions using a solution mixer in Example.

A first solution 91 was sent to a solution mixer by opening a valve 43a in a state in which valves 23a and 23b on a main flow path 21 of a solution mixer ((2) in FIG. 20) were closed. A second solution 92 was sent to the solution mixer by opening a valve 43b in a state in which valves 33 were closed ((3) in FIG. 20). Next, a pump constituted of a pump valve (23a) was started by opening 23a and 23b in a state in which the valves 43a, 43b, and 33 were closed. Then, the first solution 91 was rotatably mixed with the second solution 92 to obtain a third solution 93 ((4) in FIG. 20 and (5) in FIG. 20). The first solution 91 was sufficiently mixed with the second solution 92.

[Opening and Closing of Valve in Fluidic Device]

A fluidic device shown in FIG. 21B was produced. It was confirmed that it was possible to control the flow of a fluid through the control of the opening and closing of valves in each step shown in Table of FIG. 21A.

From the above-described results, according to the present embodiments, it is possible to quantitatively mix a solution containing target miRNA contained in an exosome and a solution containing a detection probe, using a solution mixer which has a detection unit on a flow path. Furthermore, the swift analysis of exosomes can be automated.

REFERENCE SIGNS LIST

1 . . . fluidic device, 2 . . . exosome purification unit, 2a . . . washing liquid introduction inlet, 2b . . . sample introduction inlet, 2c . . . lysis buffer introduction inlet, 2d . . . exosome immobilization unit, 2e, 2f, 2g, 3d, 3f, 4f, 4g, 4h, 5a, 10a, 11a . . . valve, 2h, 2i, 2j, 3e, 3g . . . flow path, 3 . . . biomolecule purification unit, 3b . . . biomolecule recovery liquid introduction inlet, 3c . . . biomolecule immobilization unit, 4 . . . solution mixer, 4c . . . detection unit, 5 . . . first flow path, 6 . . . second flow path, 7 . . . first waste liquid tank, 8 . . . second waste liquid tank, 9 . . . third waste liquid tank, 10 . . . third flow path, 11 . . . fourth flow path, 12 . . . fifth flow path, 20, 20', 30, 30', 40, 50, 50', 60, 70, 80 . . . solution mixer, 21a, 21b, 21c, 21d (21) . . . main flow path, 31 . . . folded structure, 22 . . . connecting flow path, 32 . . . solution discharge flow path, 23a, 23b, 23c, 23d, 23e, 23f (23) . . . main flow path valve, 24 . . . pump valve, 33a, 33b, 33c, 33d (33) . . . solution discharge flow path valve, 43a, 43b, 43c, 43d (43) . . . solution introduction flow path valve, 91 . . . first solution, 92 . . . second solution, 93 . . . third solution, 94 . . . fourth solution, 95 . . . fifth solution, 133 . . . miRNA, 131 . . . first section, 132 . . . second section, 134 . . . capture probe, 134a . . . spacer, 135 . . . detection probe, 135a . . . labeling substance, 135b . . . sequence, 135c, 135d . . . stem section, 136 substrate

What is claimed is:

1. A method of mixing a plurality of solutions in a solution mixer comprising:
   a looped main flow path;
   two main flow path valves that are disposed on the looped main flow path and compartmentalize the looped main flow path into a first partial region and a second partial region such that a volume ratio of the first partial region to the second partial region is a predetermined volume ratio;
   a first introduction flow path directly connected to the first partial region;
   a second introduction flow path directly connected to the second partial region;
   a first introduction flow path valve disposed in the first introduction flow path;
   a second introduction flow path valve disposed in the second introduction flow path;
   a first discharge flow path connected to the first partial region;
   a first discharge flow path valve disposed in the first discharge flow path;
   a second discharge flow path connected to the second partial region; and
   a second discharge flow path valve disposed in the second discharge flow path;
   the method comprising:
   (A) introducing a first solution to fill the first partial region, and a second, different solution which is different from the first solution to fill the first partial region and the second partial region, respectively; and
   (B) mixing the first solution and the second solution by the first partial region and the second partial region communicating with each other via the main flow path valves.

2. The method according to claim 1, wherein at least one of the main flow path valves is disposed in the vicinity of one of the first and second solution introduction flow paths and/or in the vicinity of the solution discharge flow path.

3. The method according to claim 1, wherein the looped main flow path includes a first flow path, a second flow path, and first and second connecting flow paths which respectively allow communication with the first flow path and the second flow path, and wherein at least one of the main flow path valves is disposed in the first connecting flow path and/or the second connecting flow path.

4. The method according to claim 1, further comprising a pump which circulates at least one of the first and second solutions in the looped main flow path.

5. The method according to claim 4,
wherein the pump includes at least three pump valves.

6. The method according to claim 1,
wherein the looped main flow path includes a detection unit that detects a substance in one or both of the first and second solutions.

7. The method according to claim 6,
wherein the substance in the solution is a biomolecule, and
wherein the detection unit includes a substrate to which a substance having affinity to the biomolecule is immobilized.

8. A method of mixing two types of solutions with each other in a solution mixer comprising:
a looped main flow path;
two main flow path valves that are disposed on the looped main flow path and compartmentalize the looped main flow path into a first partial region and a second partial region such that a volume ratio of the first partial region to the second partial region is a predetermined volume ratio;
a first introduction flow path directly connected to the first partial region;
a second introduction flow path directly connected to the second partial region;
a first introduction flow path valve disposed in the first introduction flow path;
a second introduction flow path valve disposed in the second introduction flow path;
a first discharge flow path connected to the first partial region;
a first discharge flow path valve disposed in the first discharge flow path;
a second discharge flow path connected to the second partial region; and
a second discharge flow path valve disposed in the second discharge flow path;
the method comprising:
(A) sending a first solution to the first partial region via the looped main flow path from the first solution introduction flow path, while the two main flow path valves and the solution discharge flow path valve are open, to fill the first partial region;
(B) closing the two main flow path valves;
(C) sending a second, different solution to the second partial region via the looped main flow path from the second solution introduction flow path, to fill the second partial region;
(D) closing the solution discharge flow path valve; and
(E) circulating and mixing the first solution and the second solution in the looped main flow path by opening the two main flow path valves.

9. A method of mixing a plurality of solutions with each other in a solution mixer comprising:
a first flow path, a second flow path, and first and second connecting flow paths which respectively allow communication with the first flow path and the second flow path, first and second solution introduction flow paths which are respectively connected to the first and second flow paths,
first and second solution discharge flow paths which are respectively connected to the first and second flow paths,
first and second solution discharge flow path valves which are respectively disposed in the first and second solution discharge flow paths, and
first and second main flow path valves which are respectively disposed in the first and second connecting flow paths, the first and second main flow path valves being disposed such that each of partial regions of the main flow path, which is compartmentalized by closing the first and second main flow path valves, has a predetermined volume, and
wherein the method comprises:
(A) introducing a first solution into the first flow path from the first solution introduction flow path and introducing a second, different solution into the second flow path from the second solution introduction flow path to fill one or more of the partial regions of the main flow path, while the first and second main flow path valves are closed and the first and second solution discharge flow path valves are open; and
(B) circulating and mixing the first and second solutions by closing the first and second solution discharge flow path valves and opening the first and second main flow path valves.

10. The method according to claim 9,
wherein the solution mixer further includes
a third flow path, and third and fourth connecting flow paths which respectively allow communication with the second and third flow paths,
a third solution introduction flow path which is connected to the third flow path,
a third solution discharge flow path which is connected to the third flow path,
a third solution discharge flow path valve which is disposed in the third solution discharge flow path, and
third and fourth main flow path valves which are respectively disposed in the third and fourth connecting flow paths, and
wherein the method further comprises:
(C) introducing a third solution into the third flow path from the third solution introduction flow path to fill another of the partial regions of the main flow path, while the third solution discharge flow path valve is open, before or after (B); and
(D) circulating and mixing the third solution with a mixed solution of the first and second solutions by closing the third solution discharge flow path valve and opening the third and fourth main flow path valves, after (B) and (C).

11. A method of mixing a plurality of solutions with each other in a solution mixer comprising:
a looped main flow path, in which a solution circulates, the looped main flow path including a first flow path, a second flow path, a third flow path, first and second connecting flow paths which allow communication with the first flow path and the second flow path, and third and fourth connecting flow paths which allow communication with the second flow path and the third flow path,
at least one solution introduction flow path which is connected to the first flow path, the second flow path, and the third flow path, and at least one solution discharge flow path which is connected to the first flow path, the second flow path, and the third flow path, wherein the solution discharge flow path has at least one solution discharge flow path valve, wherein each of the first to fourth connecting flow paths has at least one main flow path valve, and wherein the at least one main flow path valve and the at least one solution discharge flow path valve are disposed such that each partial region of the first to third flow paths which is compartmentalized by closing the at least one main flow path valve and the at least one solution discharge flow path valve has a predetermined volume;

wherein the method comprises:

(A) respectively introducing a first solution and a second, different solution into the first flow path and the second flow path, respectively, after closing the at least one main flow path valve and the at least one solution discharge flow path valve for the respective connecting flow path such that the first flow path and the second flow path are isolated from each other and from other flow paths, to fill the partial region of each of the first and second flow paths respectively;

(B) circulating and mixing the first solution and the second solution by opening the at least one main flow path valve such that the first flow path and the second flow path communicate with each other;

(C) closing the at least one main flow path valve and the at least one solution discharge flow path valve such that the third flow path is isolated from other flow paths, and introducing a third solution into the third flow path, and (D) circulating and mixing the third solution with a mixed solution of the first solution and the second solution by opening the at least one main flow path valve such that the first flow path, the second flow path, and the third flow path are allowed to communicate with one another.

* * * * *

SEQUENCE LISTING

```
<160> NUMBER OF SEQ ID NOS: 37

<210> SEQ ID NO 1
<211> LENGTH: 22
<212> TYPE: RNA
<213> ORGANISM: Homo sapiens

<400> SEQUENCE: 1
uaacacuguc ugguaaagau gg                                              22

<210> SEQ ID NO 2
<211> LENGTH: 21
<212> TYPE: RNA
<213> ORGANISM: Homo sapiens

<400> SEQUENCE: 2
ugagaugaag cacguagcu c                                                21

<210> SEQ ID NO 3
<211> LENGTH: 17
<212> TYPE: RNA
<213> ORGANISM: Homo sapiens

<400> SEQUENCE: 3 guggggaga ggcuguc                                                     17

<210> SEQ ID NO 4
<211> LENGTH: 23
<212> TYPE: RNA
<213> ORGANISM: Homo sapiens

<400> SEQUENCE: 4
agcagcauug uacagggcua uca                                             23

<210> SEQ ID NO 5
<211> LENGTH: 22
<212> TYPE: RNA
<213> ORGANISM: Homo sapiens

<400> SEQUENCE: 5
accacugacc guugacugua cc                                              22

<210> SEQ ID NO 6
<211> LENGTH: 22
<212> TYPE: RNA
<213> ORGANISM: Homo sapiens

<400> SEQUENCE: 6
ucaggcucag uccccucccg au                                              22

<210> SEQ ID NO 7
<211> LENGTH: 22
<212> TYPE: RNA
<213> ORGANISM: Homo sapiens

<400> SEQUENCE: 7
uagcuuauca gacugauguu ga                                              22

<210> SEQ ID NO 8
<211> LENGTH: 22
<212> TYPE: RNA
<213> ORGANISM: Homo sapiens

<400> SEQUENCE: 8
```

-continued ugagguagua gguuguauag uu　　　　　　　　　　　　　　　　　　　　22

<210> SEQ ID NO 9
<211> LENGTH: 22
<212> TYPE: RNA
<213> ORGANISM: Homo sapiens

<400> SEQUENCE: 9
ugagguagua gguugugugg uu　　　　　　　　　　　　　　　　　　　　22

<210> SEQ ID NO 10
<211> LENGTH: 22
<212> TYPE: RNA
<213> ORGANISM: Homo sapiens

<400> SEQUENCE: 10
agagguagua gguugcauag uu　　　　　　　　　　　　　　　　　　　　22

<210> SEQ ID NO 11
<211> LENGTH: 22
<212> TYPE: RNA
<213> ORGANISM: Homo sapiens

<400> SEQUENCE: 11
ugagguagua gauuguauag uu　　　　　　　　　　　　　　　　　　　　22

<210> SEQ ID NO 12
<211> LENGTH: 22
<212> TYPE: RNA
<213> ORGANISM: Homo sapiens

<400> SEQUENCE: 12
ucaccgggug uaaaucagcu ug　　　　　　　　　　　　　　　　　　　　22

<210> SEQ ID NO 13
<211> LENGTH: 60
<212> TYPE: DNA
<213> ORGANISM: Artificial Sequence
<220> FEATURE:
<223> OTHER INFORMATION: Description of Artificial Sequence: Capture
      probe1

<400> SEQUENCE: 13
accagacagt gttaacaaca acaacaacaa caacaacaac aacaacaaca acaacaacaa　　60

<210> SEQ ID NO 14
<211> LENGTH: 60
<212> TYPE: DNA
<213> ORGANISM: Artificial Sequence
<220> FEATURE:
<223> OTHER INFORMATION: Description of Artificial Sequence: Capture
      probe2

<400> SEQUENCE: 14
gtgcttcatc tcaacaacaa caacaacaac aacaacaaca acaacaacaa caacaacaac　　60

<210> SEQ ID NO 15
<211> LENGTH: 60
<212> TYPE: DNA
<213> ORGANISM: Artificial Sequence
<220> FEATURE:
<223> OTHER INFORMATION: Description of Artificial Sequence: Capture
      probe3

<400> SEQUENCE: 15 ctccccccaca caacaacaac aacaacaaca acaacaacaa caacaacaac aacaacaaca         60

<210> SEQ ID NO 16
<211> LENGTH: 60
<212> TYPE: DNA
<213> ORGANISM: Artificial Sequence
<220> FEATURE:
<223> OTHER INFORMATION: Description of Artificial Sequence: Capture
      probe4

<400> SEQUENCE: 16
ctgtacaatg ctgctacaac aacaacaaca acaacaacaa caacaacaac aacaacaaca         60

<210> SEQ ID NO 17
<211> LENGTH: 60
<212> TYPE: DNA
<213> ORGANISM: Artificial Sequence
<220> FEATURE:
<223> OTHER INFORMATION: Description of Artificial Sequence: Capture
      probe5

<400> SEQUENCE: 17
caacggtcag tggtacaaca acaacaacaa caacaacaac aacaacaaca acaacaacaa         60

<210> SEQ ID NO 18
<211> LENGTH: 60
<212> TYPE: DNA
<213> ORGANISM: Artificial Sequence
<220> FEATURE:
<223> OTHER INFORMATION: Description of Artificial Sequence: Capture
      probe6

<400> SEQUENCE: 18
gggactgagc ctgaacaaca acaacaacaa caacaacaac aacaacaaca acaacaacaa         60

<210> SEQ ID NO 19
<211> LENGTH: 60
<212> TYPE: DNA
<213> ORGANISM: Artificial Sequence
<220> FEATURE:
<223> OTHER INFORMATION: Description of Artificial Sequence: Capture
      probe7

<400> SEQUENCE: 19
agtctgataa gctaacaaca acaacaacaa caacaacaac aacaacaaca acaacaacaa         60

<210> SEQ ID NO 20
<211> LENGTH: 60
<212> TYPE: DNA
<213> ORGANISM: Artificial Sequence
<220> FEATURE:
<223> OTHER INFORMATION: Description of Artificial Sequence: Capture
      probe8

<400> SEQUENCE: 20
aacctactac ctcaacaaca acaacaacaa caacaacaac aacaacaaca acaacaacaa         60

<210> SEQ ID NO 21
<211> LENGTH: 60
<212> TYPE: DNA
<213> ORGANISM: Artificial Sequence
<220> FEATURE:
<223> OTHER INFORMATION: Description of Artificial Sequence: Capture
      probe9

<400> SEQUENCE: 21

```
acctactacc tcaacaacaa caacaacaac aacaacaaca acaacaacaa caacaacaac    60
```

<210> SEQ ID NO 22
<211> LENGTH: 60
<212> TYPE: DNA
<213> ORGANISM: Artificial Sequence
<220> FEATURE:
<223> OTHER INFORMATION: Description of Artificial Sequence: Capture
      probe10

<400> SEQUENCE: 22

```
aacctactac ctctacaaca acaacaacaa caacaacaac aacaacaaca acaacaacaa    60
```

<210> SEQ ID NO 23
<211> LENGTH: 60
<212> TYPE: DNA
<213> ORGANISM: Artificial Sequence
<220> FEATURE:
<223> OTHER INFORMATION: Description of Artificial Sequence: Capture
      probe11

<400> SEQUENCE: 23

```
atctactacc tcaacaacaa caacaacaac aacaacaaca acaacaacaa caacaacaac    60
```

<210> SEQ ID NO 24
<211> LENGTH: 60
<212> TYPE: DNA
<213> ORGANISM: Artificial Sequence
<220> FEATURE:
<223> OTHER INFORMATION: Description of Artificial Sequence: Capture
      probe12

<400> SEQUENCE: 24

```
tttacacccg gtgaacaaca acaacaacaa caacaacaac aacaacaaca acaacaacaa    60
```

<210> SEQ ID NO 25
<211> LENGTH: 17
<212> TYPE: DNA
<213> ORGANISM: Artificial Sequence
<220> FEATURE:
<223> OTHER INFORMATION: Description of Artificial Sequence: Detect
      probe1-1

<400> SEQUENCE: 25

```
ctcaactggt gtcgtgg                                                   17
```

<210> SEQ ID NO 26
<211> LENGTH: 26
<212> TYPE: DNA
<213> ORGANISM: Artificial Sequence
<220> FEATURE:
<223> OTHER INFORMATION: Description of Artificial Sequence: Detect
      probe1-2

<400> SEQUENCE: 26

```
gtcggcaatt cagttgagcc atcttt                                         26
```

<210> SEQ ID NO 27
<211> LENGTH: 26
<212> TYPE: DNA
<213> ORGANISM: Artificial Sequence
<220> FEATURE:
<223> OTHER INFORMATION: Description of Artificial Sequence: Detect
      probe2-2

<400> SEQUENCE: 27

```
gtcggcaatt cagttgagga gctaca                                         26
```

<210> SEQ ID NO 28
<211> LENGTH: 26
<212> TYPE: DNA
<213> ORGANISM: Artificial Sequence
<220> FEATURE:
<223> OTHER INFORMATION: Description of Artificial Sequence: Detect
      probe3-2

<400> SEQUENCE: 28
gtcggcaatt cagttgagga cagcct                                          26

<210> SEQ ID NO 29
<211> LENGTH: 26
<212> TYPE: DNA
<213> ORGANISM: Artificial Sequence
<220> FEATURE:
<223> OTHER INFORMATION: Description of Artificial Sequence: Detect
      probe4-2

<400> SEQUENCE: 29
gtcggcaatt cagttgagtg atagcc                                          26

<210> SEQ ID NO 30
<211> LENGTH: 26
<212> TYPE: DNA
<213> ORGANISM: Artificial Sequence
<220> FEATURE:
<223> OTHER INFORMATION: Description of Artificial Sequence: Detect
      probe5-2

<400> SEQUENCE: 30
gtcggcaatt cagttgaggg tacagt                                          26

<210> SEQ ID NO 31
<211> LENGTH: 26
<212> TYPE: DNA
<213> ORGANISM: Artificial Sequence
<220> FEATURE:
<223> OTHER INFORMATION: Description of Artificial Sequence: Detect
      probe6-2

<400> SEQUENCE: 31
gtcggcaatt cagttgagat cgggag                                          26

<210> SEQ ID NO 32
<211> LENGTH: 26
<212> TYPE: DNA
<213> ORGANISM: Artificial Sequence
<220> FEATURE:
<223> OTHER INFORMATION: Description of Artificial Sequence: Detect
      probe7-2

<400> SEQUENCE: 32
gtcggcaatt cagttgagtc aacatc                                          26

<210> SEQ ID NO 33
<211> LENGTH: 26
<212> TYPE: DNA
<213> ORGANISM: Artificial Sequence
<220> FEATURE:
<223> OTHER INFORMATION: Description of Artificial Sequence: Detect
      probe8-2

<400> SEQUENCE: 33
gtcggcaatt cagttgagaa ctatac                                          26

```
<210> SEQ ID NO 34
<211> LENGTH: 27
<212> TYPE: DNA
<213> ORGANISM: Artificial Sequence
<220> FEATURE:
<223> OTHER INFORMATION: Description of Artificial Sequence: Detect
      probe9-2.

<400> SEQUENCE: 34
gtcggcaatt cagttgagaa ccacaca                                        27

<210> SEQ ID NO 35
<211> LENGTH: 26
<212> TYPE: DNA
<213> ORGANISM: Artificial Sequence
<220> FEATURE:
<223> OTHER INFORMATION: Description of Artificial Sequence: Detect
      probe10-2

<400> SEQUENCE: 35
gtcggcaatt cagttgagaa ctatgc                                         26

<210> SEQ ID NO 36
<211> LENGTH: 27
<212> TYPE: DNA
<213> ORGANISM: Artificial Sequence
<220> FEATURE:
<223> OTHER INFORMATION: Description of Artificial Sequence: Detect
      probe11-2

<400> SEQUENCE: 36
gtcggcaatt cagttgagaa ctataca                                        27

<210> SEQ ID NO 37
<211> LENGTH: 26
<212> TYPE: DNA
<213> ORGANISM: Artificial Sequence
<220> FEATURE:
<223> OTHER INFORMATION: Description of Artificial Sequence: Detect
      probe12-2

<400> SEQUENCE: 37
gtcggcaatt cagttgagca agctga                                         26
```